(12) United States Patent
Sierecki et al.

(10) Patent No.: US 7,978,611 B2
(45) Date of Patent: Jul. 12, 2011

(54) SYSTEMS AND METHODS TO DETERMINE NETWORK ROUTES BASED ON TRANSMISSION MEDIUM LENGTH

(75) Inventors: Edward Sierecki, Concord, CA (US); Aditya Sehgal, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1594 days.

(21) Appl. No.: 11/220,055

(22) Filed: Sep. 6, 2005

(65) Prior Publication Data

US 2007/0053342 A1    Mar. 8, 2007

(51) Int. Cl.
*H04L 12/26* (2006.01)
*H04L 12/66* (2006.01)
*G06F 15/173* (2006.01)

(52) U.S. Cl. ............... 370/238; 370/252; 370/395.32; 370/401; 709/241

(58) Field of Classification Search .......... 370/238, 370/252, 395.32, 401; 709/241
See application file for complete search history.

(56) References Cited

U.S. PATENT DOCUMENTS

| | | | |
|---|---|---|---|
| 4,873,517 A | 10/1989 | Baratz et al. | |
| 5,115,495 A | 5/1992 | Tsuchiya et al. | |
| 5,535,195 A | 7/1996 | Lee | |
| 5,790,546 A * | 8/1998 | Dobbins et al. | 370/400 |
| 5,940,372 A * | 8/1999 | Bertin et al. | |
| 5,958,063 A * | 9/1999 | Croslin et al. | 714/4 |
| 5,959,975 A * | 9/1999 | Sofman et al. | 370/238 |
| 5,970,050 A * | 10/1999 | Johnson | 370/238 |
| 5,999,103 A * | 12/1999 | Croslin | 340/825.01 |
| 6,052,796 A * | 4/2000 | Croslin | 714/4 |
| 6,078,586 A * | 6/2000 | Dugan et al. | |
| 6,314,093 B1 * | 11/2001 | Mann et al. | 370/351 |
| 6,366,560 B1 * | 4/2002 | Ohiwane et al. | 370/238 |
| 6,400,681 B1 * | 6/2002 | Bertin et al. | 370/218 |
| 6,639,898 B1 * | 10/2003 | Dutta et al. | 370/238 |
| 6,646,989 B1 | 11/2003 | Khotimsky et al. | |
| 6,661,797 B1 * | 12/2003 | Goel et al. | |
| 6,697,333 B1 * | 2/2004 | Bawa et al. | 370/238 |
| 6,785,737 B2 * | 8/2004 | Lee et al. | |
| 6,813,241 B1 * | 11/2004 | Wang et al. | 370/228 |
| 6,925,061 B2 * | 8/2005 | Lee et al. | |
| 6,928,484 B1 * | 8/2005 | Huai et al. | 709/239 |
| 7,099,277 B2 * | 8/2006 | Sahinoglu et al. | 370/238 |
| 7,146,000 B2 * | 12/2006 | Hollman et al. | 379/221.06 |
| 7,187,652 B2 * | 3/2007 | Lee et al. | |
| 7,231,459 B2 * | 6/2007 | Saraph et al. | 709/241 |
| 7,257,643 B2 * | 8/2007 | Mathew et al. | |
| 7,349,427 B1 * | 3/2008 | Canning et al. | 370/466 |
| 7,355,980 B2 * | 4/2008 | Bauer et al. | |
| 7,369,767 B2 * | 5/2008 | Laalaoua | 398/57 |

(Continued)

FOREIGN PATENT DOCUMENTS

WO    2004/006137    1/2004

*Primary Examiner* — Alpus H Hsu

(74) *Attorney, Agent, or Firm* — Hanley, Flight and Zimmerman, LLC

(57) ABSTRACT

Methods, systems, and articles of manufacture to determine an administrative cost for a network path are disclosed. An example method is used to select a plurality of network segments and a plurality of network switches to determine a network path between first and second network nodes. A transmission medium length associated with the plurality of network segments and the plurality of network switches is then determined, where the administrative cost for the network path is determined based on the transmission medium length.

35 Claims, 13 Drawing Sheets

U.S. PATENT DOCUMENTS

| | | | |
|---|---|---|---|
| 7,403,483 B2 * | 7/2008 | Umezawa | 370/238 |
| 7,460,481 B2 * | 12/2008 | Vasseur et al. | 370/238 |
| 7,535,828 B2 * | 5/2009 | Raszuk et al. | 370/219 |
| 7,580,360 B2 * | 8/2009 | Bryant et al. | 370/238 |
| 7,646,719 B2 * | 1/2010 | Vasseur et al. | 370/238 |
| 2002/0120770 A1 | 8/2002 | Parham et al. | |
| 2002/0163882 A1 | 11/2002 | Bornstein et al. | |
| 2002/0172157 A1 | 11/2002 | Rhodes | |
| 2003/0016410 A1 * | 1/2003 | Zhou et al. | |
| 2003/0016411 A1 * | 1/2003 | Zhou et al. | |
| 2003/0026209 A1 * | 2/2003 | Katz | 370/238 |
| 2003/0033582 A1 | 2/2003 | Klein et al. | |
| 2003/0120804 A1 * | 6/2003 | Houston et al. | 709/238 |
| 2003/0126284 A1 * | 7/2003 | Houston et al. | 709/238 |
| 2003/0214945 A1 | 11/2003 | Kawamura | |
| 2005/0073998 A1 * | 4/2005 | Zhu et al. | 370/352 |
| 2005/0243723 A1 * | 11/2005 | Randriamasy | |
| 2005/0265251 A1 * | 12/2005 | Acharya et al. | |
| 2006/0117110 A1 * | 6/2006 | Vasseur et al. | |
| 2006/0171320 A1 * | 8/2006 | Vasseur et al. | 370/238 |
| 2006/0182035 A1 * | 8/2006 | Vasseur | 370/238 |
| 2006/0209716 A1 * | 9/2006 | Previdi et al. | 370/254 |

* cited by examiner

500a ⟶

512 ⟶

| Address Prefix | LATA/MSA | SEGMENT ID | ADMIN COST (fiber miles) |
|---|---|---|---|
| KC to Northern CA Peer Group | | | |
| 47.0115.18.40.20.10 | San Francisco-2 | KC-HOU-2 | 3155 |
| 47.0115.18.40.28.58 | Stockton | KC-HOU-2 | 3155 |

| Address Prefix | LATA/MSA | SEGMENT ID | ADMIN COST (fiber miles) |
|---|---|---|---|
| CHI to Northern CA Peer Group | | | |
| 47.0115.18.40.20.10 | San Francisco-2 | CHI-DEN | 2800 |
| 47.0115.18.40.20.18 | San Francisco-1 | CHI-DEN | 3005 |

SYSTEMS AND METHODS TO DETERMINE NETWORK ROUTES BASED ON TRANSMISSION MEDIUM LENGTH

FIELD OF THE DISCLOSURE

The present disclosure relates generally to communication systems and, more particularly, to systems and methods to determine network routes based on transmission medium length.

BACKGROUND

Network operators or communication service providers use administrative costing to determine network paths to communicate across a data network. An administrative cost (i.e., a cost) is an indication or a measure of the performance associated with transmitting data via a particular network segment or network path. For example, a network operator may determine a cost associated with a plurality of network paths between a source node and a destination node and select the network path associated with the least administrative cost to communicate the data. In traditional communication systems a cost for a network path is determined based on network congestion delay, bandwidth availability, and/or the number of switch hops associated with that network path.

Traditional routing methods for frame relay (FR) and asynchronous transfer mode (ATM) networks typically use routing protocols such as a Private Network to Network Interface (PNNI) protocol to exchange routing information between switches and Open Shortest Path First (OSPF) algorithms to determine network paths. In traditional systems, the routing information includes costs based on network congestion delay, available bandwidth, switch hops, etc. between source and destination switches. Each switch in a network uses the routing information and OSPF to determine a shortest path between that switch and a destination switch based on network congestion delay, available bandwidth, or a number of switch hops and attempts to communicate data via the shortest path, which is associated with the lowest cost.

Traditional methods that use network delay, bandwidth, or switch hops as the cost measure for selecting a network path are often not suitable for determining a network path across a network spanning a relatively large geographical distance or area (e.g., a nationwide network or an international network). For example, the network congestion delay or available bandwidth at any particular switch in a nationwide network may be miniscule compared to the geographical or physical distance through which data must be communicated. When such is the case, selecting a network path based on the least congestion delay may not provide the network path associated with the least data transmission time.

Further, traditional network systems typically use PNNI or Hierarchical PNNI (HPNNI) routing protocols throughout an entire network to determine network paths. The PNNI routing protocol requires each switch in a network to obtain routing information associated with the entire topology of the network or routing information required to communicate with every switch in the network. The HPNNI routing protocol is implemented by dividing an entire network into peer groups. In this case, each switch within a peer group obtains detailed routing information associated with communicating with switches in the same peer group. To communicate with switches in other peer groups each switch in a peer group obtains via switches designated as peer group leaders only general routing information associated with communicating with switches in other peer groups.

The PNNI and HPNNI routing protocols require switches to advertise routing information to other switches. In this manner, when switches establish a network path the switches can use the routing information to establish the network path. Each time a switch advertises its routing information, the switch must build a routing table by gathering routing information associated with its routing perception of the network or at least of the switches to which it directly communicates. The switch must then transmit the routing information from the routing table to the requesting switch. As more nodes or switches are added to a network and the network becomes larger, advertising costs in this manner becomes relatively more demanding on each switch. For example, gathering the routing information requires more and more processing power and time as a network grows. Also, the amount of memory required to store the routing information becomes relatively large. Typically, the processing power and memory requirements restrict the PNNI routing protocol to be used in limited-sized networks because of the manner in which the PNNI routing protocol requires each switch to obtain routing information about the entire topology of the network. Some traditional methods use HPNNI to overcome the scalability limitations associated with PNNI. However, these traditional methods typically produce sub-optimal end-to-end routing decisions.

BRIEF DESCRIPTION OF THE DRAWINGS

FIGS. 5A and 5B depict example network routing tables associated with the example telecommunications network of FIG. 1.

DETAILED DESCRIPTION

Figure 1:
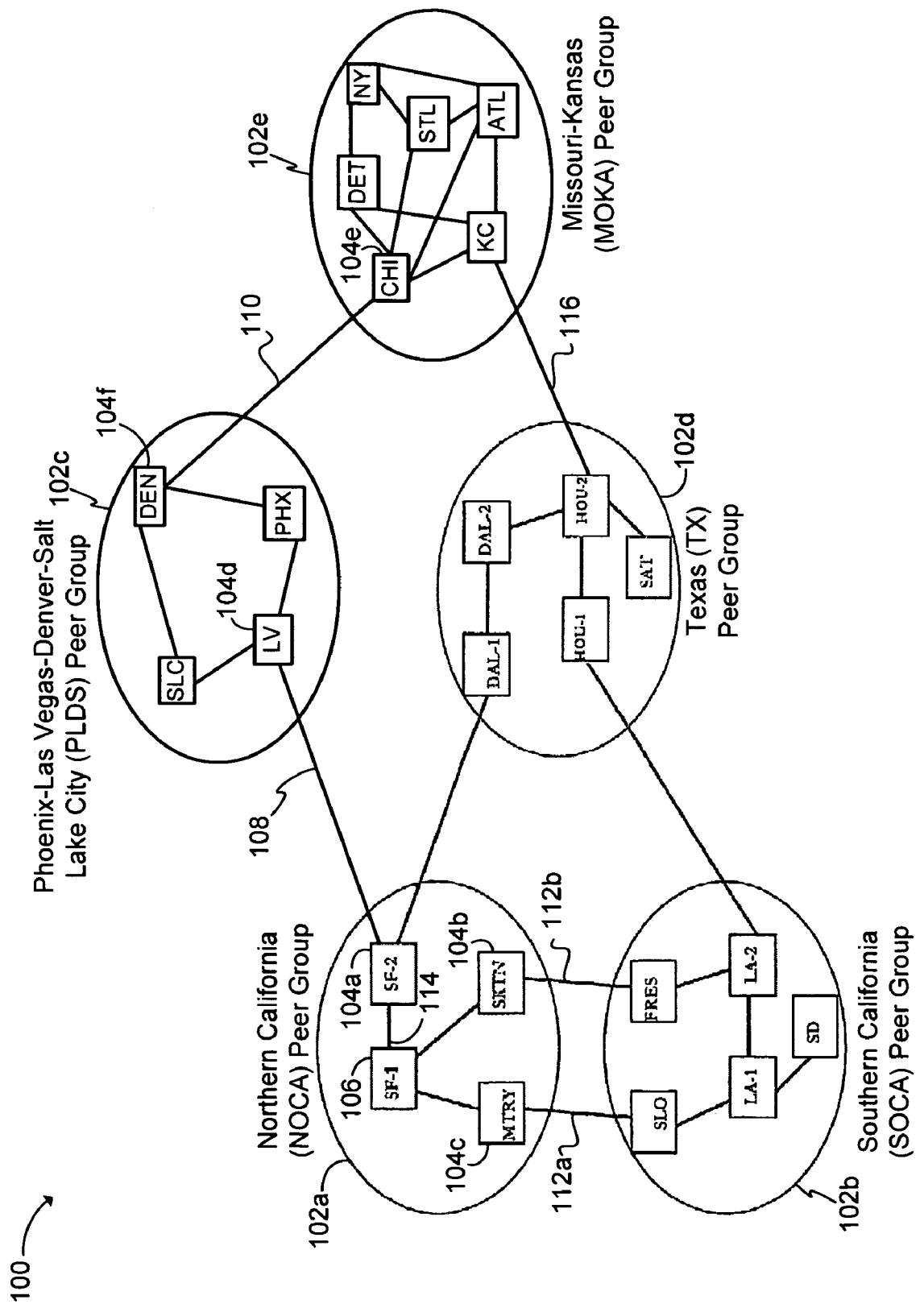
FIG. 1 is a diagram illustrating an example telecommunications network.

Although the following discloses example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

The example systems and methods described herein may be used to determine network routes based on transmission medium length for communicating data through a telecommunications network. As described below, an example implementation involves using transmission medium lengths and switch factor values to determine administrative costs for network segments. Routing protocols such as, for example, OSPF, may use the administrative costs to determine network paths between nodes in telecommunications networks. In a preferred embodiment, routing protocols may use the administrative costs to determine optimal network paths such as, for example, network paths having the least administrative cost. The example methods and systems may be used in connection with relatively large networks (e.g., nationwide network, international networks, multi-peer group networks, etc.) by using protocols such as, for example, ATM Inter-Network Interface (AINI), and a plurality of static routing tables to store the administrative costs. Example methods described herein may be used to determine addresses or address prefixes and administrative costs associated with destination nodes and store same in routing tables for subsequent use by, for example, AINI and OSPF protocols to determine network paths across telecommunications networks based on transmission medium length.

An example method involves selecting a plurality of network segments and a plurality of network switches to determine a network path between a first network node and a second network node. A transmission medium length value associated with the plurality of network segments and the plurality of network switches is then determined. An administrative cost for the network path is determined based on the transmission medium length value.

An example system to determine administrative costs for network paths includes a routing group generator configured to form a routing group that includes at least one network node. The example system also includes an address selector communicatively coupled to the routing group generator and configured to determine an address prefix associated with the routing group. In addition, the example system includes an administrative cost generator communicatively coupled to the routing group generator and the address selector and configured to determine an administrative cost for a network path between a source node and the routing group based on a transmission medium length value.

An example network to determine administrative costs for network paths includes a plurality of network nodes and a plurality of network segments. At least a first one of the network nodes includes a routing table to store at least one transmission medium length value associated with a network path between the first network node and a second network node. The first network node may determine an administrative cost between the first and second network nodes based on the transmission medium length value.

The example methods and systems are described below in connection with frame relay (FR) and asynchronous transfer mode (ATM) networks using a Private Network to Network Interface (PNNI) and an AINI. The ATM networks described below include a plurality of nodes. Each of the plurality of nodes may be implemented using a network switch. To determine network paths as described below, the nodes may be grouped to form a plurality of subnetwork peer groups (i.e., peer groups). Each of the peer groups includes one or more internally accessible nodes or switches (i.e., intra-group nodes or intra-group switches) and one or more externally accessible nodes or switches (i.e., inter-group nodes or inter-group switches). Externally accessible nodes or inter-group nodes within a peer group are designated as peer group leader nodes. Nodes communicate information between peer groups across a relatively large network (e.g., a nationwide network or an international network) via the inter-group nodes. Specifically, as described in greater detail below in connection with FIG. 1, nodes within a particular peer group communicate information to nodes in other peer groups via one or more inter-group nodes within that same peer group.

Each inter-group switch includes a network routing table (i.e., a routing table) used to store routing information such as, for example, administrative costs, associated with communicating data to or exchanging data with a plurality of nodes (e.g., destination nodes) in other peer groups. As described below, the cost associated with communicating data between peer groups is determined based on a physical length of transmission medium (e.g., optic fiber, copper cable, air, etc.) through which data must travel when communicated from a source node in an originating peer group to a destination node in a terminating peer group. In nationwide or international networks, the amount of time required for data to travel cross country or internationally is typically dictated by the physical length of transmission medium (i.e., the transmission medium length) through which the data must travel. That is, the transmission time required for an electron to travel through a transmission medium is directly proportional to the physical length of the transmission medium length. Traditional systems that use network congestion delay or bandwidth metrics to select network paths may select paths that are not associated with least transmission times if the transmission time associated with the physical length of a transmission medium outweighs the transmission time associated with network congestion delay or bandwidth. In other words, although a first network path may have favorable network congestion delay or bandwidth, the physical length of transmission medium in that network path may create or be associated with a greater transmission time than a second network path having less favorable congestion delay or bandwidth but a shorter transmission medium length.

In the example implementations described herein, a source node uses transmission medium length administrative costs to determine a network path to a destination node and to establish communication path that is a permanent virtual circuit (PVC), between a destination node in a terminating peer group and the source node in an originating peer group. For each inter-group node added to a peer group, a system engineer, a hardware system (e.g., an example system 700 of FIG. 7), and/or a processor system (e.g., an example processor system 1000 of FIG. 10) determines a plurality of transmission medium length values associated with communicating data from that inter-group node to destination nodes in other peer groups to generate a plurality of administrative costs associated with communicating with each destination switch via the inter-group switch. The administrative costs for each inter-group node are then stored in a routing table associated with that inter-group node (e.g., stored in a switch used to implement the inter-group node). In this manner, the administrative costs associated with communicating between peer groups may be determined once and used a plurality of times during network communications to determine network paths via which to establish PVC's.

Determining the transmission medium length administrative costs associated with communicating between peer groups once and storing the administrative costs in switches used to implement inter-group routing nodes reduces the bandwidth overhead required to establish a PVC during data communications. Also, determining the administrative costs in this manner increases the predictability of data flow or data paths within a network. For example, a network operator may better predict or control the selection of network paths by network nodes during data communications by determining which inter-group nodes within a peer group are associated with more favorable administrative costs (e.g., least transmission medium length) for communicating data to particular destination nodes and are, thus, more likely to be selected by a source node.

After a customer requests that a network operator provision a communication link (e.g., a PVC) between particular source and destination nodes, a system engineer configures the source node to establish a PVC between the source node and the destination node. Prior to communicating data, the source node obtains the transmission medium length administrative costs stored in the routing tables of every inter-group node within the same peer group as the source node and that is able to communicate with the destination node. The source node then determines a cost associated with a network path between the source and destination nodes and selects an inter-group node via which to communicate the data based on the cost of the network path. Specifically, the source node determines the cost associated with the network path by determining one or more network path costs (e.g., PVC costs) based on transmission medium length (e.g., the transmission medium length associated with establishing a PVC between the source and destination nodes), selecting the network path having the least network path cost, and subsequently selecting the inter-group node within the same peer group as the source node that may be used to form the selected network path. In this manner, without obtaining administrative costs associated with nodes in other peer groups, a source node can use the transmission medium length costs stored in the routing tables associated with the same peer group (e.g., stored in a switch within the same peer group) as the source node to select the inter-group node via which a least cost PVC is most likely to be established.

Now turning in detail to FIG. 1, an example telecommunications network 100 includes a plurality of peer groups 102a-e. Specifically, the telecommunications network 100 includes a Northern California (NOCA) peer group 102a, a Southern California (SOCA) peer group 102b, a Phoenix-Las Vegas-Denver-Salt Lake City (PLDS) peer group 102c, a Texas (TX) peer group 102d, and a Missouri-Oklahoma-Kansas-Arkansas (MOKA) peer group 102e. Each of the peer groups 102a-e is formed by grouping a plurality of nodes (e.g., inter-group nodes and intra-group nodes) and network segments. Each of the peer groups 102a-e includes at least one inter-group node and at least one intra-group node. For example, the NOCA peer group 102a includes three inter-group nodes: a San Francisco-2 (SF-2) inter-group node 104a, a Stockton (SKTN) inter-group node 104b, and a Monterey (MTRY) inter-group node 104c. In addition, the NOCA peer group 102a includes a SF-1 intra-group node 106. A source node in an originating peer group is configured to communicate information to a destination node in a terminating peer group via an inter-group node. In some cases the source node may be the inter-group node. Although not shown, each of the nodes (e.g., the inter-group nodes 104a-c and the intra-group node 106) is communicatively coupled to a plurality of point of presence (POP) devices (e.g., a POP device 806 of FIG. 8) or point of termination (POT) devices (not shown), which enable customers to access the example telecommunications network 100 as is well known in the art. Also, in some example implementations, the nodes (e.g., the inter-group nodes 104a-c and the intra-group node 106) shown in FIG. 1 may be local access and transport areas (LATA's) that include one or more network switches.

To reduce the number of administrative costs associated with establishing communication links (e.g., PVC's) between nodes, the nodes depicted in the example telecommunications network 100 may be grouped into routing groups as described in detail below in connection with FIG. 4. For example, the inter-group and intra-group nodes within a peer group may be grouped into a particular LATA, a service area, a metropolitan service area (MSA), or any other routing group described below. In this manner, instead of generating three administrative costs for three distinct neighboring destination nodes, the three neighboring destination nodes may be grouped into a routing group. A network operator may then generate one administrative cost associated with communicating data to any of the three neighboring nodes within the routing group.

To establish PVC's, inter-group nodes and intra-group nodes may exchange routing information (e.g., routing control messages) between one another as described below. A routing control message generated by a node includes information (e.g., network addresses or ID's) associated with communicating data from that node to each adjacent node. Inter-group nodes and intra-group nodes of one peer group can exchange routing control messages directly with inter-group nodes and intra-group nodes of the same peer group. While inter-group nodes are capable of exchanging routing control messages directly with intra-group nodes within a same or a respective peer group and directly with inter-group nodes of other peer groups, intra-group nodes can directly exchange routing control messages only with inter-group nodes and intra-group nodes within a same or a respective peer group. For example, the SF-2 inter-group node 104a is capable of exchanging routing control messages directly with a Las Vegas (LV) inter-group node 104d of the PLDS peer group 102c and with the SF-1 intra-group node 106. On the other hand, the SF-1 intra-group node 106 can directly exchange routing control messages with only the inter-group nodes 104a-c of the NOCA peer group 102a. The nodes in the network 100 may be used to establish PVC's as described below in connection with FIG. 6 so that any node in the network 100 may exchange data with any other node in the network 100 via the PVC's.

Inter-group nodes (e.g., the inter-group nodes 104a-d) are communicatively coupled to inter-group nodes of other peer groups via inter-group network segments or inter-group trunks (i.e., network paths that communicatively couple peer groups or peer groups to one another). For example, the SF-2 inter-group node 104a is communicatively coupled to the LV inter-group node 104d via an LV-SF-2 inter-group network segment 108. Also, the MOKA peer group 102e is communicatively coupled to the PLDS peer group 102c via a CHI-DEN inter-group network segment 110 that communicatively couples a Chicago (CHI) inter-group node 104e to a Denver (DEN) inter-group node 104f. Other peer groups are communicatively coupled to one another via respective inter-group network segments. The inter-group network segments may be implemented using any physical transmission medium such as, for example, optic fiber, copper fiber, air, etc. In the example telecommunications network 100, the AINI protocol is used to implement the Open Systems Interconnection (OSI) layer two switch protocol used in combination with inter-group network segments to communicatively couple the peer groups 102a-e.

Two peer groups may be communicatively coupled via one or more inter-group network segments. For example, the NOCA peer group 102a is communicatively coupled to the SOCA peer group 102b via two inter-group network segments including a first N-SCA inter-group network segment 112a and a second N-SCA inter-group network segment 112b, while the NOCA peer group 102a is communicatively coupled to the PLDS peer group 102c via one inter-group network segment: the LV-SF-2 inter-group network segment 108.

Intra-group nodes (e.g., the SF-1 intra-group node 106) are communicatively coupled to other intra-group nodes and inter-group nodes within the same or respective peer group via intra-group network segments. For example, the SF-1 intra-group node 106 is communicatively coupled to the SF-2 inter-group node 104a via an intra-group network segment 114. The intra-group network segments may be implemented using any physical transmission medium such as, for example, optic fiber, copper fiber, air, etc. In the example telecommunications network 100, the PNNI protocol is used to implement the OSI layer two switch protocol used with the intra-group network segments to communicatively couple nodes within the same peer group.

Figure 2:
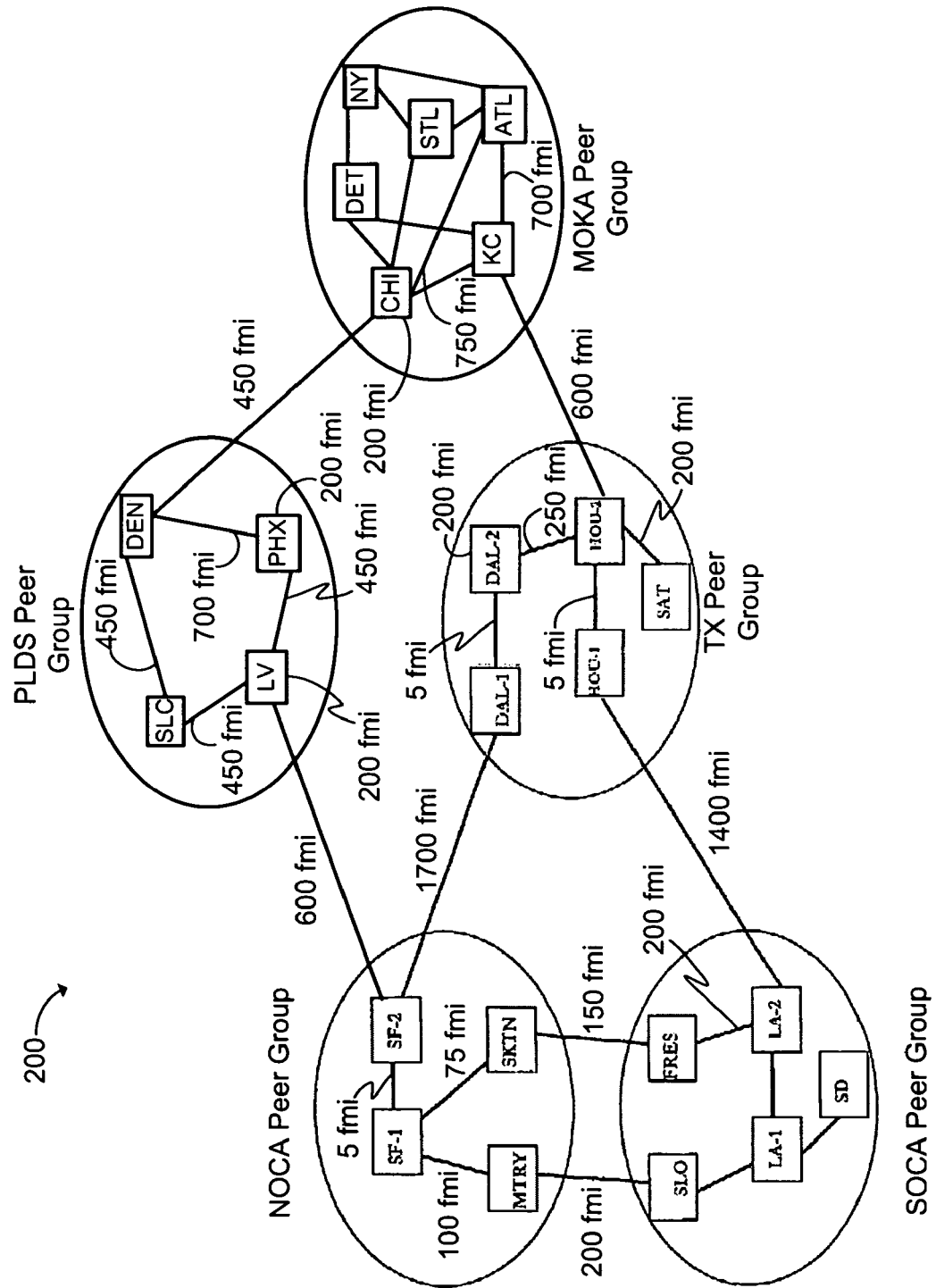
FIG. 2 depicts an example transmission medium length map of the telecommunications network of FIG. 1.

FIG. 2 depicts an example transmission medium length map 200 of the telecommunications network 100 of FIG. 1. The transmission medium length map 200 indicates the physical length of transmission medium between each node in the telecommunications network 100. Each time an inter-group node or a peer group is added to the telecommunications network 100, a network operator (e.g., a system engineer, the example system 700 of FIG. 7, or the processor system 1000 of FIG. 10) may use the example transmission medium length map 200 or a data structure (e.g., a network configuration database 702 and/or a transmission medium length database 704 of FIG. 7) storing transmission medium lengths indicated on the transmission medium length map 200 to determine model network paths between the newly added inter-group node (or each inter-group node of the newly added peer group) and each destination node to which the inter-group node is configured to communicate. A model network path may be a network path having relatively less transmission medium length than other network paths, a typical or average network path, or a network having relatively more transmission medium length than other network paths. For example, a network path having relatively less transmission medium length may be determined to predict the most likely network path that a plurality of nodes between a source node and a destination node would select to communicate data between the source and destination nodes. In a preferred example implementation, the model network path is an optimal network path such as, for example, a network path having relatively less transmission medium length than other network paths.

In general, the network operator determines the administrative cost for each model network path (i.e., a model network path cost) by selecting a combination of network segments and switches (e.g., nodes) and then adding the transmission medium length for each network segment (i.e., the fiber length between neighboring or consecutive switches) and a switch factor value for each switch between the inter-group node and the destination nodes. In this manner, the network operator determines a total transmission medium length between the inter-group node and a destination node.

In an example implementation, a system engineer may manually determine the model network path cost by referring to a printed version or a computer display graphical representation of the example transmission medium length map 200 or by referring to a spreadsheet having the transmission medium lengths indicated on the example transmission medium length map 200 and adding the transmission medium lengths along the model network path. In an alternative example implementation, the example system 700 (FIG. 7) or the processor system 1000 (FIG. 10) may be configured using, for example, integrated circuits and/or a sequence of instructions, to retrieve from a database the transmission medium lengths indicated on the example transmission medium length map 200 and determine the model network path cost based on the retrieved transmission medium lengths. In the example telecommunications network 100, the physical length of the transmission medium is measured or represented using fiber miles, which indicates the length of fiber in miles between any two nodes or switches. However, the physical length may be measured using any other desired physical length metric or any other measure of length such as, for example, kilometers, feet, yards, etc.

As previously described, each node in the example telecommunications network 100 may be implemented using a switch. Each switch is assigned or associated with a switch factor value. The switch factor value represents an equivalent physical length of transmission medium for each intervening switch between an inter-group node and a destination node. In this manner, a model network path cost is expressed using a transmission medium length value representing the transmission medium length for every network segment and the equivalent transmission medium length for every switch between the inter-group node and the destination node. A network operator may assign the same switch factor value for each switch in the network 100 or it may assign different switch factor values depending on the manufacturer, model, and/or any other criteria associated with the switches. In the example telecommunications network 100, the switch factor value for each switch is set to 200 fiber miles.

Figure 3:
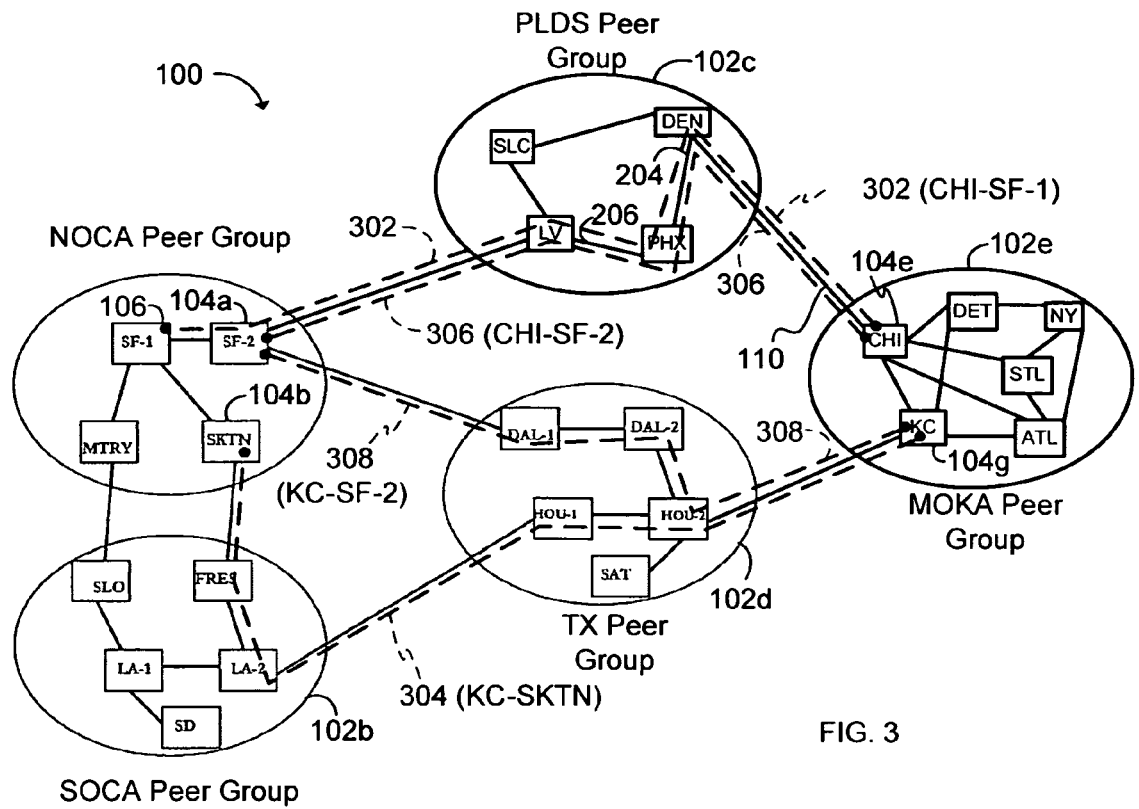
FIG. 3 depicts a plurality of model network paths between some of the switches of the example telecommunications network of FIG. 1.

FIG. 3 depicts a plurality of model network paths between some of the nodes of the example telecommunications network 100 of FIG. 1. A network operator may determine the model network paths based on the transmission medium lengths and the switch factor values depicted in the example transmission medium length map 200 of FIG. 2. A model network path may traverse one or more peer groups. For example, a CHI-SF-1 model network path 302 between the CHI inter-group node 104e and the SF-1 intra-group node 106 traverses the PLDS peer group 102c.

A network operator determines inter-group and intra-group network segment costs associated with the model network path to determine the model network path administrative cost for a model network path that traverses one or more peer groups. The network operator determines the inter-group network segment cost by determining the inter-group network segments that communicatively couple the peer groups traversed by the model network path and then summing the transmission medium lengths for the inter-group network segments. The network operator determines the intra-group network segment cost by selecting one or more nodes and intra-group network segments of the peer group that form a path through the peer group. For example, the network operator may determine an intra-group network segment cost by selecting a combination of nodes and intra-group segments that form a path through the peer group having relatively less transmission medium length than other paths through the peer group.

A model network path administrative cost may be determined according to Equation 1 below.

$$\text{administrative cost} = \sum_{k=1}^{k=i} SC_k + \sum_{j=1}^{j=l} SW_j \quad \text{Equation 1}$$

As shown in Equation 1 above, a model network path administrative cost is equal to a sum of segment costs (SC) added to a sum of switch factors (SW). The sum of segments costs SC is determined by adding the segment costs for all of the inter-group and intra-group network segments $$\left( \sum_{k=1}^{k=i} SC_k \right)$$

used to form the model network path and the sum of switch factors SW is determined by adding the switch factors for all of the switches $$\left( \sum_{j=1}^{j=l} SW_j \right)$$

used to form the model network path.

In some cases, a model network path traverses two or more peer groups even though another possible network path between the two nodes may traverse only one other peer group. For example, if a Kansas City (KC) inter-group node 104g is configured to communicate to the SKTN inter-group node 104b, a model network path administrative cost for a network path between the inter-group nodes 104g and 104b may be determined based on a KC-SKTN model network path 304 traverses the TX peer group 102d and the SOCA peer group 102b. In the illustrated example, the KC-SKTN model network path 304, which traverses two peer groups, has the least transmission medium length than any network path that traverses only the TX peer group 102d.

A peer group may have two or more inter-group nodes that can communicate data to or exchange data with the same destination node. Each of the inter-group nodes may function as a backup inter-group node for the other inter-group node to enable other nodes within the same peer group to communicate with the destination node when one of the inter-group nodes is not available (e.g., broken, flooded, etc.). As shown in FIG. 3, the CHI inter-group node 104e and the KC inter-group node 104g are both configured to communicate data to or exchange data with the SF-2 inter-group node 104a. A CHI-SF-2 model network path 306 between the CHI inter-group node 104e and the SF-2 inter-group node 104a traverses the PLDS peer group 102c, and a KC-SF-2 model network path 308 between the KC inter-group node 104g and the SF-2 inter-group node 104a traverses the TX peer group 102d. The administrative cost for the CHI-SF-2 model network path 306 is 2800 fiber miles and the administrative cost for the KC-SF-2 model network path 308 is 3155 fiber miles.

To establish a PVC via which to communicate data, a source node within the same peer group as the CHI and KC inter-group nodes 104e and 104g that needs to communicate data to the SF-2 inter-group node 104a will select the inter-group node (e.g., one of the inter-group nodes 104e and 104g) associated with a network path between the source node and the SF-2 inter-group node 104a having the least model network path administrative cost (e.g., the least transmission medium length). Because the CHI-SF-2 model network path 306 is associated with less transmission medium length than the KC-SF-2 model network path 308, a node within the MOKA peer group 102e that is separated by the same amount of transmission length from the CHI inter-group node 104e and the KC inter-group node 104g is more likely to select the CHI inter-group node 104e rather than the KC inter-group node 104g and communicate data to the SF-2 inter-group node 104a via the CHI inter-group node 104e. However, if the CHI inter-group node 104e is not available, the KC inter-group node 104g serves as a backup and any node within the MOKA peer group 102e may exchange data with or communicate data to the SF-2 inter-group node 104a via the KC inter-group node 104g.

Figure 4:
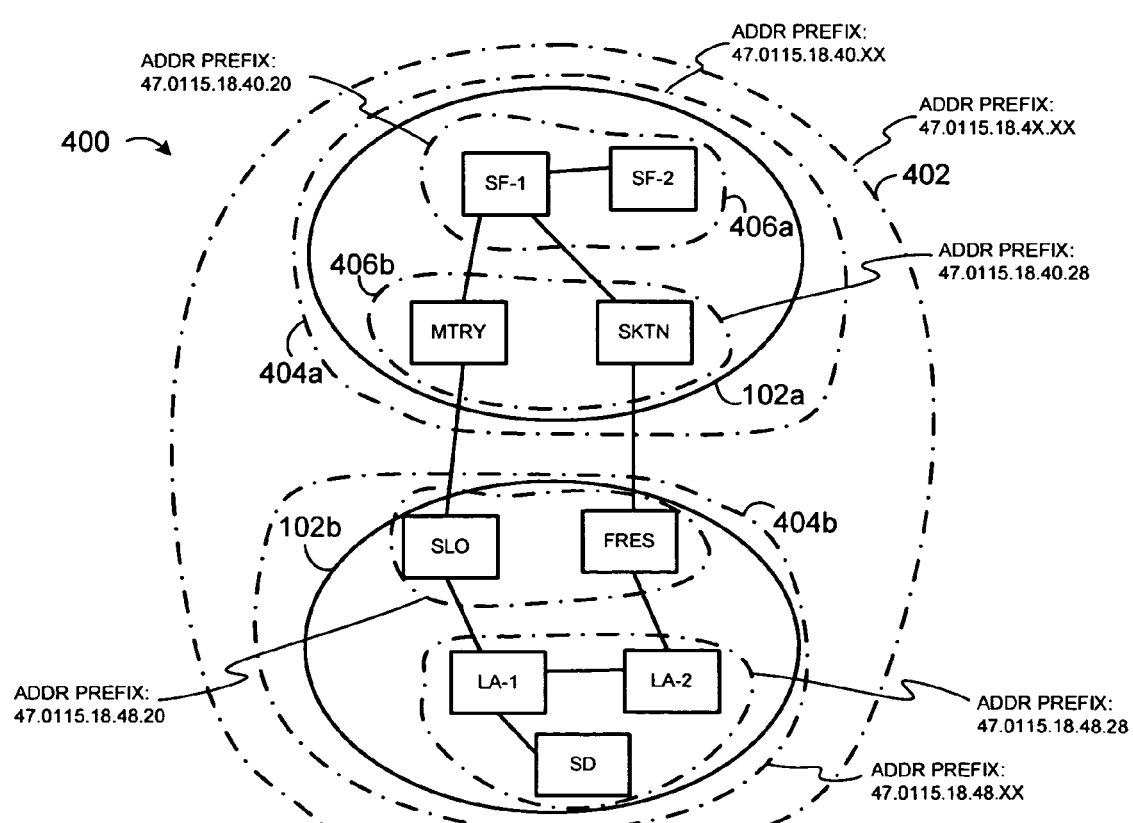
FIG. 4 is an example address map depicting example routing groups within the telecommunications network of FIG. 1.

FIG. 4 is an example address map 400 that depicts example routing groups associated with the NOCA and SOCA peer groups 102a and 102b of the telecommunications network 100 of FIG. 1 and depicts the relationship between the routing groups and the address prefixes associated with those routing groups. Nodes are grouped into routing groups as shown in FIG. 4 to reduce the number of administrative costs associated with establishing communication links (e.g., PVC's) between the nodes. As described below, each routing group is associated with an address prefix that forms part of the network address of each node within that routing group. In this manner, an operator may determine a single administrative cost for each address prefix of each routing group that can be subsequently used to establish PVC's to any of the nodes within that routing group. The preciseness of the model network path administrative costs determined as described above can vary depending on the precision of the specified destination to which an inter-group node is configured to communicate data. For example, a destination may be specified as a specific destination node (e.g., a specific destination address) or the destination may be specified as a routing group (e.g., an address prefix associated with a plurality of nodes).

Specifying a specific destination node enables a network operator to determine a relatively precise administrative cost based on the transmission medium length between an inter-group node and the specific destination node. On the other hand, specifying the destination as a routing group decreases the relative precision of the administrative cost for communicating to each of the nodes within the routing group because a general-area administrative cost associated a routing group is determined based on the transmission medium length between the inter-group node and a logical network center of the routing group instead of the transmission medium length between the inter-group node and a specific destination node. However, determining a general-area administrative cost reduces maintenance required to update the administrative costs when nodes are removed or added. Additionally, determining general-area administrative costs reduces or eliminates scalability issues associated with processing power and memory required by each switch of a network (e.g., the example telecommunications network 100) as the size of the network increases.

The address prefixes and addresses of the nodes within the example telecommunications network 100 may be determined using, for example, a hierarchical addressing configuration or addressing scheme. An example hierarchical addressing configuration that can be used in combination with PNNI and AINI protocols is ATM End System Addresses (AESA). In AESA, the first six hexadecimal digits of a node ID or address are assigned by a standards body to a specific network operator. The network operator then defines the remainder of the node ID or address for each node. The hierarchical addressing configuration provides various levels of destination granularity or precision for determining model network paths and PVC's. The addressing configuration may be determined using various conditions, guidelines, or requirements. For example, nodes within a common geographic area may have common higher order address bits (e.g., most significant address bits) or address prefixes. The number of higher order address bits that are common between nodes within a geographic area may increase as the size of the geographic area decreases or as the number of nodes within a geographic area decreases.

In the illustrated example address map 400 of FIG. 4, the NOCA and SOCA peer groups 102a and 102b are partitioned into a plurality of routing groups of different sizes. Specifically, the NOCA and SOCA peer groups 102a and 102b may be grouped into a state-level routing group 402, the nodes within the NOCA peer group 102a may be grouped into a NOCA peer group routing group 404a, and the nodes within the SOCA peer group 102b may be grouped into a SOCA peer group routing group 404b. The number of bits or digits used to form the address prefix of each routing group increases as the size of the routing group or number of nodes (e.g., node density) in the routing group decreases. For example, the state-level routing group 402 is the largest routing group depicted in the example address map 400, and all of the nodes within the state-level routing group 402 have an address prefix 47.0115.18.4X.XX, which includes nine most significant digits. The address prefix of the NOCA peer group routing group 404a is 47.0115.18.40.XX and the address prefix of the SOCA peer group routing group 404b is 47.0115.18.48.XX, each of which is formed using relatively more bits or digits (ten most significant digits) than the address prefix of the state-level routing group 402 because each of the peer group routing groups 404a and 404b include relatively less nodes than the state-level routing group 402.

In an example implementation, a network operator may determine a general-area administrative cost associated with communicating information between an inter-group node (e.g., the CHI inter-group node 104e of FIGS. 1 and 3) in an originating peer group and the nodes within the state-level routing group 402 by specifying the destination as the address prefix 47.0115.18.4X.XX, determining a model network path between the inter-group node and the logical center of the state-level routing group 402, and determining the transmission medium length used to form the model network path. The inter-group node (e.g., the CHI inter-group node 104e) or any source node within the same originating peer group as the inter-group node may use the general-area administrative cost to determine a network path to any node within the state-level routing group 402 including any node subsequently added to the state-level routing group 402 without requiring the network operator to determine another administrative cost specifically for the subsequently added node. Thus, determining a general-area administrative cost associated with a larger routing group reduces the administrative cost maintenance associated with subsequent additions or removals of particular nodes within the routing group and eliminates scalability issues associated with processing power and memory required by each switch of a network (e.g., the example telecommunications network 100) as the size of the network increases.

The relative precision of a general-area administrative cost may be increased by decreasing the size of the routing group for which an administrative cost is determined. For example, general-area administrative costs may be determined based on the address prefixes of the NOCA and SOCA peer group routing groups 404a and 404b instead of the address prefix of the state-level routing group 402. To determine relatively more precise general-area administrative costs, the nodes within the peer group routing groups 404a and 404b may be further partitioned into network LATA-level routing groups. As shown in FIG. 4, the NOCA peer group routing group 404a is partitioned into a first NOCA LATA-level routing group 406a and a second NOCA LATA-level routing group 406b. Because the LATA-level routing groups 406a and 406b are smaller routing groups than the peer group routing group 404a, the address prefixes of the LATA-level routing groups 406a and 406b are formed using more digits (twelve most significant digits) than the address prefix of the peer group routing group 404a. Specifically, the address prefix of the first NOCA LATA-level routing group 406a is 47.0115.18.40.20 and the address prefix of the second NOCA LATA-level routing group 406b is 47.0115.18.40.28. The general-area administrative costs determined for communicating to the nodes within each of the LATA-level routing groups 406a and 406b are relatively more precise than the general-area administrative costs determined for communicating to the nodes based on the state-level routing group 402 or the peer group routing group 404a and 404b.

FIGS. 5A and 5B depict an example KC inter-group node network routing table 500a and a CHI inter-group node network routing table 500b associated with the example telecommunications network 100 of FIG. 1. Routing tables that are substantially similar or identical to the network routing tables 500a and 500b (i.e., the routing tables 500a and 500b) are stored in inter-group nodes (e.g., the inter-group nodes 104a -g of FIGS. 1, and 3) and configured to store routing information such as, for example, destination addresses (e.g., addresses of destination nodes) or destination address prefixes (e.g., address prefixes of routing groups), model network path administrative costs, general-area administrative costs, etc. In the illustrated example, the KC inter-group node routing table 500a is stored in network equipment (e.g., a switch) used to implement the KC inter-group node 104g (FIG. 3) and the CHI inter-group node routing table 500b is stored in network equipment (e.g., a switch) used to implement the CHI inter-group node 104e (FIGS. 1 and 3).

The routing table information may be communicated by the inter-group nodes to any node within the same peer group and used by the nodes to determine network paths via which to establish PVC's as described below in connection with FIG. 6 to communicate data to nodes in other peer groups. As shown in FIGS. 5A and 5B, the example routing tables 500a and 500b include a plurality of routing table entries 502 that form a first routing list 504 and a second routing list 506. The first routing list 504 includes addresses or address prefixes of the destination nodes to which the KC inter-group node 104g can transmit data and the second routing list 506 includes addresses or address prefixes of the destination nodes to which the CHI inter-group node 104e can transmit data. Although, the example routing tables 500a and 500b include addresses and administrative costs associated with specific nodes, in other example implementations the example routing tables 500a and 500b or substantially similar or identical routing tables may include address prefixes and general-area administrative costs associated with routing groups such as, for example, the state-level routing group 402, the peer group routing group 404a and 404b, and/or the LATA-level routing group 406a and 406b of FIG. 4.

Each of the routing table entries 502 in the first routing list 504 includes an administrative cost or model network path cost associated with the transmission medium length between the KC inter-group node 104g and a destination node of the NOCA peer group 102a. For example, a first routing table entry 510 corresponds to the KC-SF-2 model network path 308 (FIG. 3) and indicates that the administrative cost or model network path cost associated with transmitting data via the KC-SF-2 model network path is 3155 (i.e., 3155 fiber miles).

Each of the example routing tables 500a and 500b also includes a segment ID column 512 used to store the network segment ID's of the inter-group network segments (e.g., the CHI-DEN inter-group network segment 110 of FIG. 1) communicatively coupled to the inter-group nodes (e.g., the CHI inter-group node 104e and/or the KC inter-group node 104g of FIG. 3) of the originating peer group (e.g., the MOKA peer group 102e) with which the routing table entries 502 are associated. A network segment ID may be used to determine the switch port of an inter-group node to which the inter-group network segment is communicatively coupled.

Figure 6:
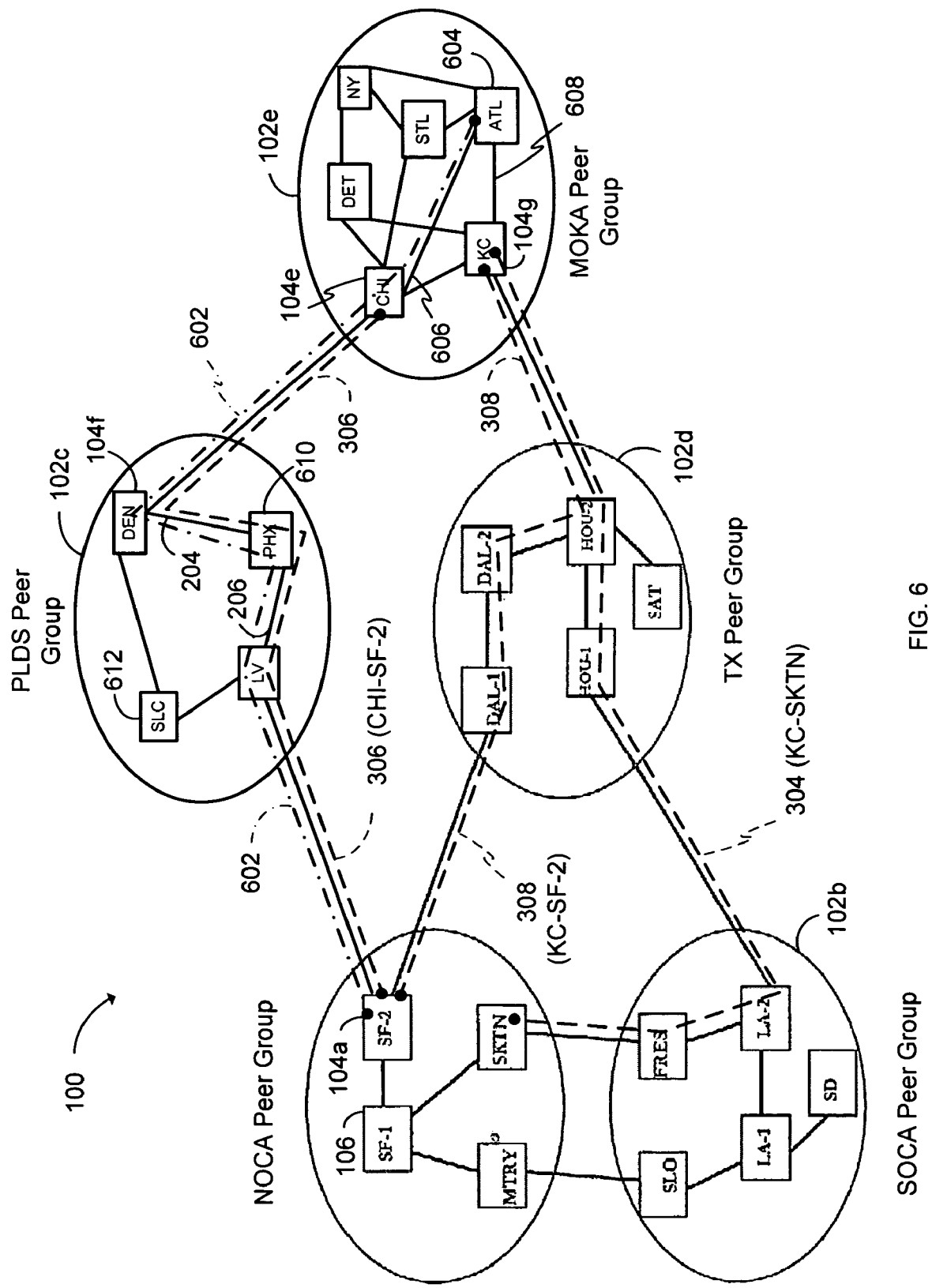
FIG. 6 depicts an example permanent virtual circuit established in the example telecommunications network of FIG. 1.

FIG. 6 depicts an example PVC 602 established in the example telecommunications network 100 of FIG. 1. A network operator establishes a PVC by first provisioning the PVC between a source node (e.g., a PVC source node) and a destination node (e.g., a PVC destination node) in response to, for example, a customer request to exchange data between the source and destination nodes. Specifically, the network operator configures the source node as is well known in the art to establish a PVC between the source node and the destination node to enable the source node to communicate data to and/or exchange data with the destination node. For example, the network operator may provision the PVC by entering PVC setup information (e.g., PVC setup information 812 of FIG. 8) into a network management system, which then communicates the PVC setup information to the source node. In response to the PVC setup information, the source node uses administrative cost information (e.g., transmission medium length information) stored in routing tables (e.g., the routing tables 500a and 500b of FIG. 5) of inter-group nodes within the same peer group (e.g., the originating peer group) as the source node to select a particular inter-group node via which to communicate data to or exchange data with the destination node. A signaling protocol in accordance with, for example, the AINI protocol and/or the PNNI protocol is then used to establish a PVC between the source node and the destination node via the selected inter-group node as described below. After the PVC is established, the PVC may remain established for any duration of time (e.g., hours, days, months, years, etc.) and the source and destination nodes may exchange data with one another via the PVC.

To communicate data to the SF-2 inter-group node 104a from an Atlanta (ATL) intra-group node 604 in the MOKA peer group 102e, the ATL intra-group node 604 may select one of the CHI inter-group node 104e and the KC inter-group node 104g as an egress gateway of the MOKA peer group 102e via which to establish a PVC to the SF-2 inter-group node 104a. The ATL intra-group node 604 selects the one of the CHI and KC inter-group nodes 104e and 104g that is associated with the network path between the ATL intra-group node 604 and the SF-2 inter-group node 104a having the least network path administrative cost (e.g., relatively less transmission medium length) based on the model network path administrative costs stored in the routing tables 500a and 500b of the CHI and KC inter-group nodes 104e and 104g.

A source node or a PVC source node may determine a network path administrative cost (i.e., a network path transmission medium length) or a total administrative cost associated with transmitting data between the PVC source and destination nodes based on the model network path administrative costs associated with the PVC destination node and the intra-group administrative costs associated with any nodes or switches and intra-group network segments (e.g., intra-group network segments 606 and 608) that communicatively couple the PVC source node to the selected inter-group node or egress gateway (e.g., one of the CHI and KC inter-group nodes 104e and 104g). Each inter-group node of a peer group may advertise or communicate the information in its routing table (e.g., one of the example routing tables 500a and 500b) to every node within the same peer group. In this manner, a PVC source node can obtain the model network path administrative costs associated with communicating data to the PVC destination node via each of the inter-group nodes, and determine the network path costs for transmitting data to nodes in terminating peer groups.

If the ATL intra-group node 604 selects a network path via which to transmit data to the SF-2 inter-group node 104a based on the CHI inter-group node 104e and the KC inter-group node 104g, the ATL intra-group node 604 may determine a first network path cost associated with using the CHI inter-group node 104e as described above, determine a second network path cost associated with using the KC inter-group node 104g as described above, compare the first and second network path costs, and select the network path having the relatively lower network path cost (e.g., less transmission medium length or fiber miles). In this case, the network path includes or uses the CHI inter-group node 104e because it is associated with a relatively lower network path cost.

In the illustrated example, the ATL intra-group node 604 (e.g., the PVC source node) determines the network path cost associated with transmitting data from the ATL intra-group node 604 to the SF-2 inter-group node 104a (e.g., the PVC destination node) via the CHI inter-group node 104e by summing the intra-group network segment cost (i.e., the intra-group network segment transmission medium length) for the intra-group network segment 606, the intra-group switch factor cost (i.e., the intra-group switch factor transmission medium length) for the CHI inter-group node 104e, and the model network path administrative cost stored in the routing table 500b (FIG. 5B) for communicating data between the CHI inter-group node 104e and the SF-2 inter-group node 104a. In this case, the network path cost for a network path between the ATL intra-group node 604 and the SF-2 inter-group node 104a via the CHI inter-group node 104e is 3750 fiber miles (e.g., model network path cost (2800 fiber miles)+intra-group cost for the intra-group network segment 606 (750 fiber miles)+switch factor cost for CHI inter-group node 104e (200 fiber miles)).

The ATL intra-group node 604 may determine the network path cost associated with transmitting data from the ATL intra-group node 604 to the SF-2 inter-group node 104a via the KC inter-group node 104g by adding the intra-group administrative cost associated with the intra-group network segment 608 and the switch factor cost of the KC inter-group switch 104g to the model network path administrative cost stored in the routing table 500a for communicating data from the KC inter-group node 104g to the SF-2 inter-group node 104a.

After the ATL intra-group node 604 selects the CHI inter-group node 104e as the inter-group node via which to communicate data to the SF-2 inter-group node 104a, the ATL intra-group node 604 and every node between the ATL intra-group node 604 and the SF-2 inter-group node 104a use a signaling protocol to establish the example PVC 602 between the ATL intra-group node 604 and the SF-2 inter-group node 104a via the CHI inter-group node 104e as is well known in the art. Typically, the signaling protocol is used to establish a PVC along a network path, which may be the model network path on which the network operator based the model network path administrative cost for communicating between the selected inter-group node and the destination node. For example, in the illustrated example depicted in FIG. 6, the example PVC 602 is established along the CHI-SF-2 model network path 306.

For cases in which any node or inter-group segment used to form the model network path (e.g., the CHI-SF-2 model network path 306) is not available at the time of establishing the PVC, the nodes between the selected inter-group node and the PVC destination node use the signaling protocol to establish another network path. For example, as shown in FIGS. 3 and 6, the CHI-SF-2 model network path 306 is formed using a Phoenix (PHX) intra-group node 610 to traverse the PLDS peer group 102c. However, if the PHX intra-group node 610 is unavailable (e.g., broken, uninstalled, etc.) while the ATL intra-group node 604 is establishing the example PVC 602, then the DEN inter-group node 104f selects a node other than the PHX intra-group node 610 via which to establish the PVC 602 through the PLDS peer group 102c. In this case, the PVC 602 may be established via a Salt Lake City (SLC) intra-group node 612 in the PLDS Peer Group 102c instead of via the PHX intra-group node 610.

Figure 7:
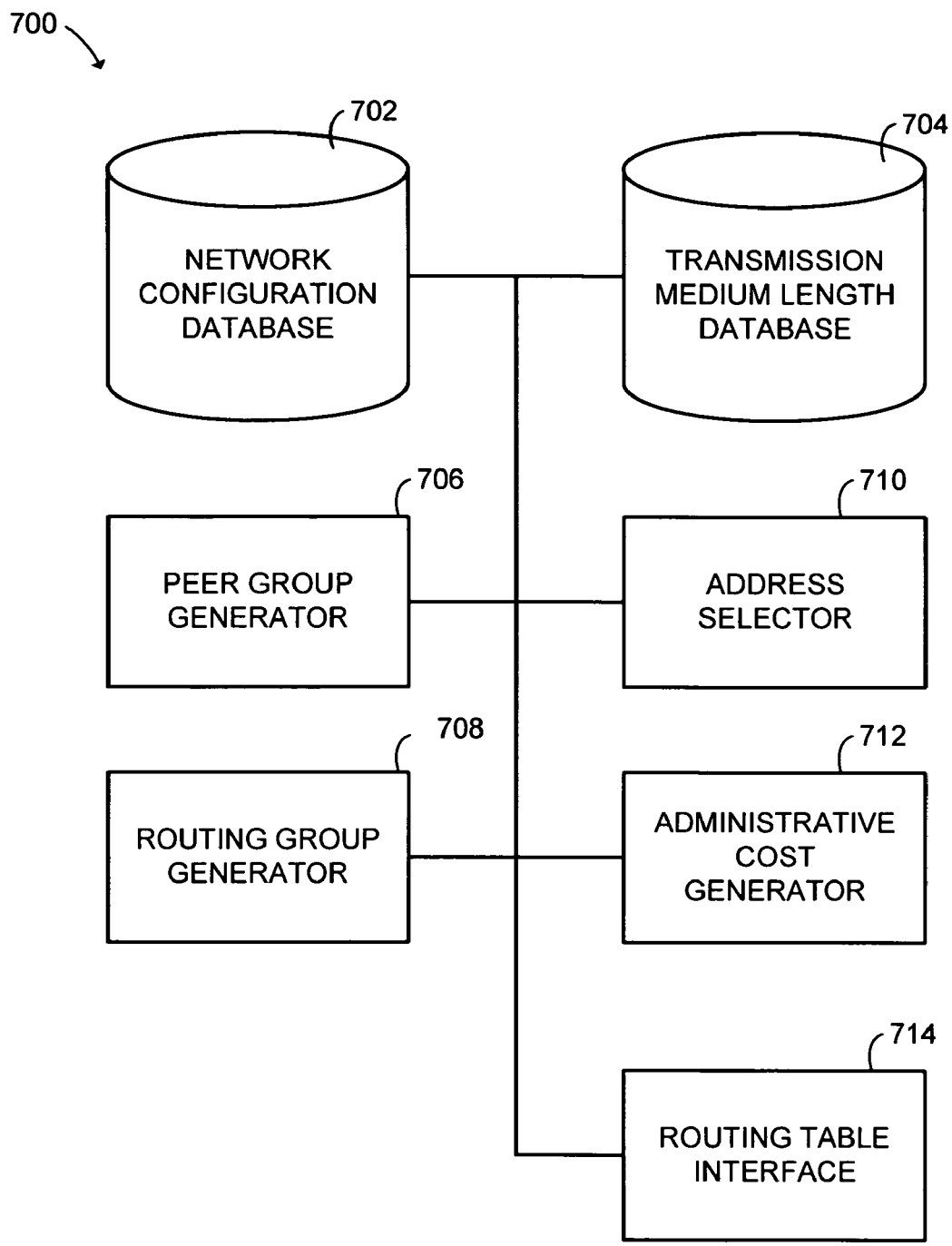
FIG. 7 is a block diagram of an example system that may be used to determine model network path administrative costs.

FIG. 7 is a block diagram of an example system 700 that may be used to determine model network path administrative costs. The structures shown in FIG. 7 may be implemented using any desired combination of hardware and/or software. For example, one or more integrated circuits, discrete semiconductor components, or passive electronic components may be used. Additionally or alternatively, some or all, or parts thereof, of the structures of FIG. 7 may be implemented using instructions, code, or other software and/or firmware, etc. stored on a computer-readable medium that, when executed by, for example, a processor system (e.g., the processor system 1010 of FIG. 10), perform at least some of the methods disclosed herein. Of course, the structures depicted in FIG. 7 are shown and described below by way of example, and any portion or portions thereof may be changed or rearranged to produce results substantially similar or identical to those described herein.

The example system 700 includes a network configuration database 702 configured to store network segment ID's and node ID's (e.g., switch addresses) and configuration information associated with how the network segments and nodes of the example telecommunications network 100 are communicatively coupled. The example system 700 includes a transmission medium length database 704 configured to store transmission medium length values associated with each network segment of the example telecommunications network 100. The transmission medium length database 704 also stores switch factor values associated with the switches or nodes of the example telecommunications network 100. For example, the transmission medium length database 704 may store the transmission medium length values and the switch factor values depicted in the example transmission medium length map 200 of FIG. 2. In an example implementation, the transmission medium length database 704 may store each of the transmission medium length values in a record entry associated with a respective network segment ID or node ID matching a network segment ID or node ID in the network configuration database 702.

The example system 700 includes a peer group generator 706 configured to group the nodes (e.g., the inter-group nodes 104a-c and the intra-group node 106 of FIG. 1) into peer groups (e.g., the peer groups 102a-e of FIG. 1). The peer group generator 708 is configured to obtain ID's or addresses of network segments and switches or nodes from the network configuration database 702. The peer group generator 706 may use several criteria, conditions, guidelines, or requirements to form peer groups. For example, the peer group generator 706 may form peer groups that are small enough (e.g., having no more than a maximum number of nodes) to comply with scalability limits of particular equipment (e.g., network switches) used to implement the nodes. The peer groups may also have sufficient nodes to provide a plurality of routing options for network paths that traverse the peer groups. The peer group generator 706 may also form each peer group using nodes that are within a relatively proximate or close geographical area. In some cases, the peer group generator 706 may form a peer group using nodes that are used to communicate information to destinations within a common general area (e.g., to the east coast, to a particular state, etc.). Also, the peer group generator 706 may form peer groups based on common equipment manufacturers (e.g., manufacturer A switches in one peer group and manufacturer B switches in another peer group).

The example system 700 includes a routing group generator 708 configured to form routing groups (e.g., the routing groups 402, 404a-b, and 406a-b of FIG. 4). The routing group generator 708 is configured to obtain ID's or addresses of network segments and switches or nodes from the network configuration database 702 and peer group information from the peer group generator 706. In this manner, the routing group generator 708 may form routing group configurations based on the nodes within the example telecommunications network 100 and the peer groups 102a-e of FIG. 1.

To determine address prefixes associated with nodes within the routing groups formed by the routing group generator 708, the example system 700 includes an address selector 710. Specifically, for each routing group, the address selector 710 is configured to determine a common address prefix associated with all of the nodes within that routing group. In the illustrated example, the address selector 710 is configured to use various conditions, guidelines, or requirements to determine the address prefixes and addresses associated with the nodes. The routing group generator 708 may use the addressing hierarchy configuration to determine routing groups (e.g., the routing groups 402, 404a-b, and 406a-b of FIG. 4) having nodes of common address prefixes.

The example system 700 includes an administrative cost generator 712 to determine administrative costs (e.g., transmission medium lengths) associated with each network segment and node (e.g., switch) added to the example telecommunications network 100. For example, the administrative cost generator 712 may obtain user input having transmission medium length or switch factor values associated with each network segment and node or the administrative cost generator 712 may analyze an electronic map such as, for example, the transmission medium length map 200 of FIG. 2 to obtain transmission medium length values and switch factor values. In any case, the administrative cost generator 712 may store the transmission medium length values and the switch factor values in the transmission medium length database 704.

The administrative cost generator 712 may also determine administrative costs (e.g., transmission medium lengths) associated with model network paths (e.g., the CHI-SF-1 model network path 302 of FIG. 3) between inter-group nodes and destination nodes or routing groups. In the illustrated example, the administrative cost generator 712 obtains network segment information and node information from the peer group generator 706 and the routing group generator 708 and obtains address and address prefix information from the address selector 710. In this manner, the administrative cost generator 712 may determine the destination node or target routing group and associated address or address prefix for which to determine an administrative cost for a model network path.

The administrative cost generator 712 may be configured to perform any arithmetical operation(s) to determine administrative costs. In the illustrated example, the administrative cost generator 712 is configured to multiply the number of switches used to form a model network path by a switch factor value described above in connection with FIG. 2 to determine an equivalent transmission medium length for the selected switches. The administrative cost generator 712 is also configured to add transmission medium length values associated with network segments and switch factor values of nodes to determine model network path administrative costs. To store administrative cost values in routing tables, the example system 700 includes a routing table interface 714. The administrative cost generator 712 communicates administrative costs to the routing table interface 714, and the routing table interface 714 stores the model network path administrative costs in respective routing tables (e.g., the routing tables 500a and 500b of FIGS. 5A and 5B) of inter-group nodes in the telecommunications network 100 of FIGS. 1, 3, and 6.

Figure 8:
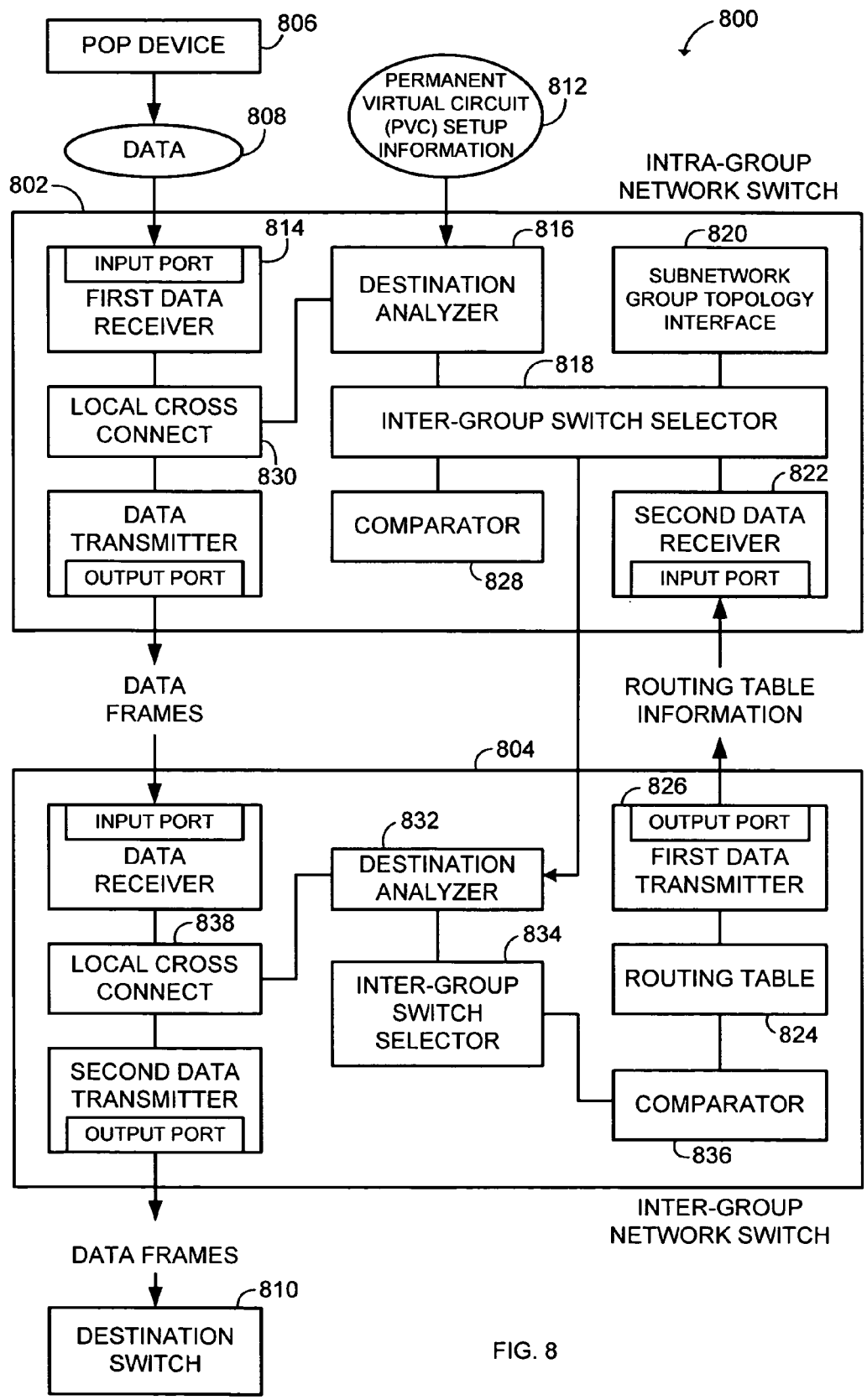
FIG. 8 is a block diagram of an example system that may be used to select a network path based on transmission medium length.

FIG. 8 is a block diagram of an example system 800 that may be used to select a network path based on transmission medium length. The example system 800 includes an intra-group switch 802 that is communicatively coupled to an inter-group switch 804, both of which are part of the same peer group (e.g., one of the peer groups 102a-e of FIGS. 1-3 and 6). The structures shown in FIG. 8 may be implemented using any desired combination of hardware and/or software. For example, one or more integrated circuits, discrete semiconductor components, or passive electronic components may be used. Additionally or alternatively, some or all, or parts thereof, of the structures of FIG. 8 may be implemented using instructions, code, or other software and/or firmware, etc. stored on a computer-readable medium that, when executed by, for example, a processor system (e.g., the processor system 1010 of FIG. 10), perform at least some of the methods disclosed herein. Of course, the structures of FIG. 8 are shown and described below by way of example, and any portion or portions thereof may be changed or rearranged to produce results similar or identical to those disclosed herein.

The intra-group switch 802 and the inter-group switch 804 may be used to implement any intra-group node and inter-group node, respectively, of FIGS. 1, 3, and 6. The intra-group switch 802 may be communicatively coupled to a POP device 806, which may be a switch, a router, or any other network device used to allow a customer or customer equipment to access the example telecommunications network 100 (FIG. 1). Of course, the intra-group switch 802 may be communicatively coupled to another switch or any other type of networking device. The inter-group switch 804 may be communicatively coupled to one or more nodes within the same peer group and other peer groups. For example, the intra-group switch 802 can communicate or transmit data 808 originating at the POP device 806 to nodes in other subnetwork peer groups via the inter-group switch 804. In the illustrated example, the inter-group switch 804 is configured to communicate data to a destination switch 810. The destination switch 810 is within a different peer group than the intra-group and inter-group switches 802 and 804. For example, the intra-group switch 802 may be the ATL intra-group node 604 (FIG. 6), the inter-group switch 804 may be the CHI inter-group node 104e (FIGS. 1, 3, and 6), and the destination switch 810 may be the SF-2 inter-group node 104a (FIGS. 1, 3, and 6).

In general, the intra-group switch 802 is configured to obtain PVC setup information 812 and select an inter-group node associated with a network path via which to communicate or transmit the data 808 to the destination. The PVC setup information 812 may be generated based on a customer request made to a service provider (e.g., a network operator) to setup or establish a PVC, and includes source and destination information. The service provider then enters the PVC setup information 812 into a network management system (not shown). The network management system then selects a source node (e.g., the intra-group switch 802) and communicates the PVC setup information 812 to the source node.

The intra-group switch 802 determines a network path using the PVC setup information 812 based on model network path administrative costs and intra-group administrative costs associated with inter-group nodes that are capable of communicating data to the destination as described above in connection with FIG. 6. For example, if the PVC setup information 812 specifies a destination associated with the first destination switch 810, the intra-group switch 802 determines if the network path between the intra-group switch 802 and the destination switch 810 includes the inter-group switch 804. The intra-group switch 802 may obtain the model network path administrative cost associated with communicating data to the first destination switch 810 via the inter-group switch 804 from a routing table (e.g., a routing table 824 described below) that is substantially similar or identical to the routing tables 500a and 500b of FIGS. 5A and 5B and stored in the inter-group switch 804 as described below.

The intra-group switch 802 includes a first data receiver 814 configured to receive the data 808 from the POP equipment 806. The data 808 may be communicated from the POP device 806 to the first data receiver 814 in data packets, data frames, or any other suitable format. The intra-group switch 802 includes a destination analyzer 816 that is configured to receive the PVC setup information 812 and determine destination information (e.g., a destination address) associated with the PVC setup information 812 as is well known in the art.

In the illustrated example, the intra-group switch 802 includes an inter-group switch selector 818 configured to obtain destination addresses from the destination analyzer 816 and select a network path for transmitting data (e.g., the data 808) to respective destination addresses. The inter-group switch selector 818 is communicatively coupled to a peer group topology interface 820 and a second data receiver 822. The peer group topology interface 820 may be used to store the administrative costs of the intra-group network segments (e.g., the intra-group network segments 606 and 608 of FIG. 6) and the switch factor costs of any switches required to communicatively couple the intra-group switch 802 to any inter-group node (e.g., the inter-group switch 804) within the same peer group as the intra-group switch 802. The peer group topology interface 820 may obtain administrative costs of any intra-group network segment and node within the same peer group using the PNNI protocol, which is used by every node within the same peer group to periodically advertise to other nodes within that peer group the costs associated with communicating to those nodes.

The second data receiver 822 is configured to obtain from the inter-group switch 804 model network path administrative costs associated with communicating data to the destination switch 810 from the inter-group switch 804. For example, the inter-group switch 804 may include the routing table 824 that is substantially similar or identical to the example routing tables 500a and 500b described above in connection with FIGS. 5A and 5B and that is used to store a model network path administrative cost associated with the destination switch 810. The inter-group switch 804 includes a first data transmitter 826 to communicate or transmit routing table information stored in the routing table 824 to the second data receiver 822 of the intra-group switch 802.

The inter-group switch selector 818 may determine the network path costs associated with communicating the data 808 via a network path (e.g., a PVC) established between the intra-group switch 802 and the destination switch 810 via the inter-group switch 804. For example, the inter-group switch selector 818 may determine the network path cost of a network path formed using the inter-group switch 804 by adding the model network path administrative cost associated with the inter-group switch 804 to the intra-group administrative costs or intra-group transmission medium length of any switches and intra-group network segments required to communicatively couple the intra-group switch 802 to the inter-group switch 804. The inter-group switch selector 818 may also determine network paths costs associated with other inter-group nodes to which the intra-group switch 802 is communicatively coupled within the same peer group and which are capable of communicating data to the destination switch 810. For example, if the intra-group switch 802 is used to implement the ATL intra-group node 604 (FIG. 6) and the destination switch 810 is used to implement the SF-2 inter-group node 104a (FIGS. 1, 3, and 6), then the inter-group switch selector 818 may determine a first network path cost associated with communicating data to the destination switch 810 via the CHI inter-group node 104e (FIG. 6) and a second network path cost associated with communicating data to the destination switch 810 via the KC inter-group node 104g (FIG. 6).

A comparator 828 obtains the network path costs from the inter-group switch selector 818 and compares the network path costs to one another to determine which one of a plurality of inter-group nodes within the same peer group as the intra-group switch 802 is associated with a network path having relatively less transmission medium length (e.g., least network path cost) between the intra-group switch 802 and the destination switch 810. The comparator 828 may communicate a node ID or switch address of the inter-group node associated with the network path having the least cost to the inter-group switch selector 818. For example, if the network path includes the inter-group switch 804, then the comparator 828 communicates the switch address of the inter-group switch 804 to the inter-group switch selector 818.

The inter-group switch selector 818 then uses the node ID or switch address of the selected inter-group node to route a portion of the PVC between the intra-group switch 802 and the inter-group switch 804. Also, in the illustrated example, the inter-group switch selector 818 is configured to use a routing signaling protocol to cause the nodes between the intra-group switch 802 and the destination switch 810 to establish a PVC (e.g., the example PVC 602 of FIG. 6) between the intra-group switch 802 and the destination switch 810 via the inter-group switch 804. In this manner, the intra-group switch 802 can communicate subsequent data obtained from the POP device 806 to the destination switch via the established PVC. For example, a local cross connect 830 may obtain the a destination address of the PVC setup information 812 from the destination analyzer 816 and use the destination address to communicate the data 808 to a destination switch via the established PVC as is well known in the art.

For cases in which the inter-group switch 804 (instead of the intra-group switch 802) is the source node, the inter-group switch 804 is configured to also determine a network path and select an inter-group node within the same peer group via which to communicate to a destination node in a manner that is substantially similar to the manner in which the intra-group switch 802 selects an inter-group node. For example, although not shown, the inter-group switch 804 may also be communicatively coupled to a POP device (e.g., the POP device 806) and to other inter-group nodes within the same peer group. In this case, if the inter-group switch 804 is the source node for a data communication, the inter-group switch 804 may determine if a network path between the inter-group switch 804 and the destination node has the least administrative cost than any other network path that may be formed between the inter-group switch 804 and the destination node via another inter-group node within the same peer group as the inter-group switch 804. The inter-group switch 804 may use the model network path administrative costs stored in the routing table 824 and in routing tables of other inter-group nodes to determine a network path and select an inter-group node via which to establish a PVC.

For the purposes of determining a network path and selecting an inter-group node, the inter-group switch 804 includes a destination analyzer 832, an inter-group switch selector 834, a comparator 836, and a local cross connect 838. The destination analyzer 832 is substantially similar or identical to the destination analyzer 816, the inter-group switch selector 834 is substantially similar or identical to the inter-group switch selector 818, the comparator 836 is substantially similar or identical to the comparator 828, and the local cross connect 838 is substantially similar or identical to the local cross connect 830.

FIGS. 9A through 9E are flow diagrams of example methods that may be used to implement the example systems and methods described herein. Specifically, the flow diagrams of FIGS. 9A through 9E depict example methods associated with determining model network path administrative costs and selecting inter-group switches associated with network paths via which to communicate or transmit data to destination switches. The example methods depicted in the flow diagrams of FIGS. 9A through 9E may be implemented in software, hardware, and/or any combination thereof. For example, the example methods may be implemented in software that is executed via the example processor system 1000 of FIG. 10 and/or hardware systems configured according to the example system 700 (FIG. 7), the example intra-group switch 802 (FIG. 8), and/or the example inter-group switch 804 (FIG. 8). Although, the example methods are described below as a particular sequence of operations, one or more operations may be rearranged, added, and/or eliminated to achieve the same or similar results.

Figure 9A:
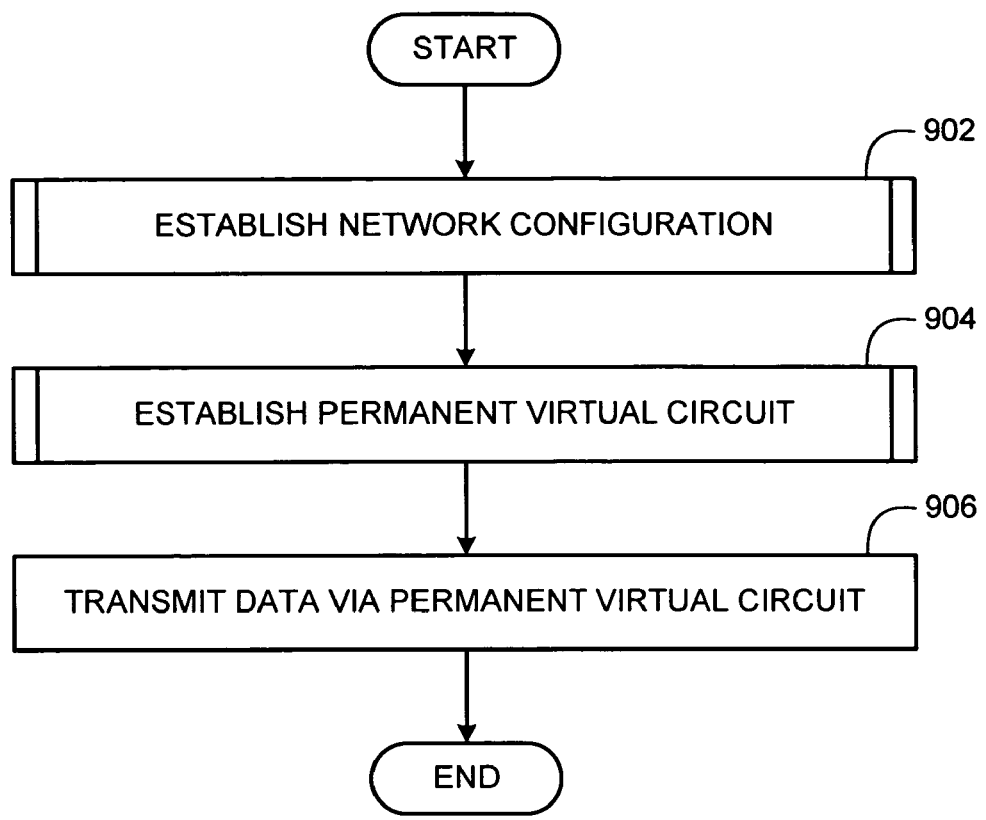
FIGS. 9A-9E are flow diagrams of example methods that may be used to implement the example systems and methods described herein.

As shown in FIG. 9A, initially a network operator determines and/or establishes a network configuration (block 902) based on a plurality of inter-group switches (e.g., the inter-group switches 104a-g of FIGS. 1, 3, and 6) and intra-group switches (e.g., the intra-group switches 106 (FIG. 1), 604, and 610 (FIG. 6)). The network configuration may be determined by a system engineer and/or using a processor system (e.g., the processor system 1000 of FIG. 10) or a hardware system (e.g., the example system 700 of FIG. 7). The operation of block 902 is described in detail below in connection with FIGS. 9B, 9C, and 9D. The network operator then establishes a PVC (block 904) based on the network configuration determined at block 902. In a preferred implementation, the PVC is established based on an optimal network path such as, for example, a network path having relatively less transmission medium length than other network paths. The operation of block 904 is described in detail below in connection with FIG. 9E. Data is then transmitted via the PVC (block 906) as is well known in the art.

Figure 9B:
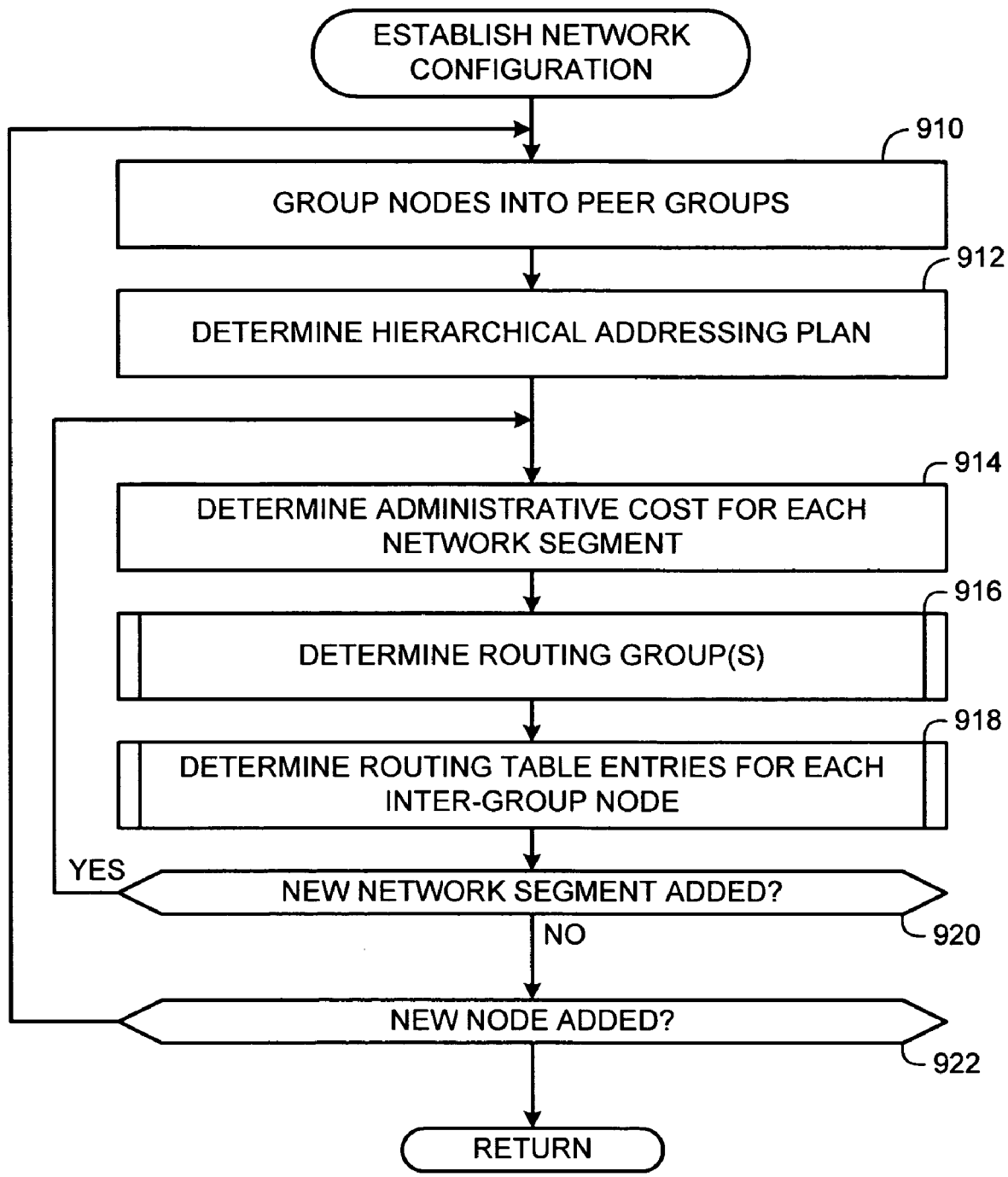
Figure 9C:
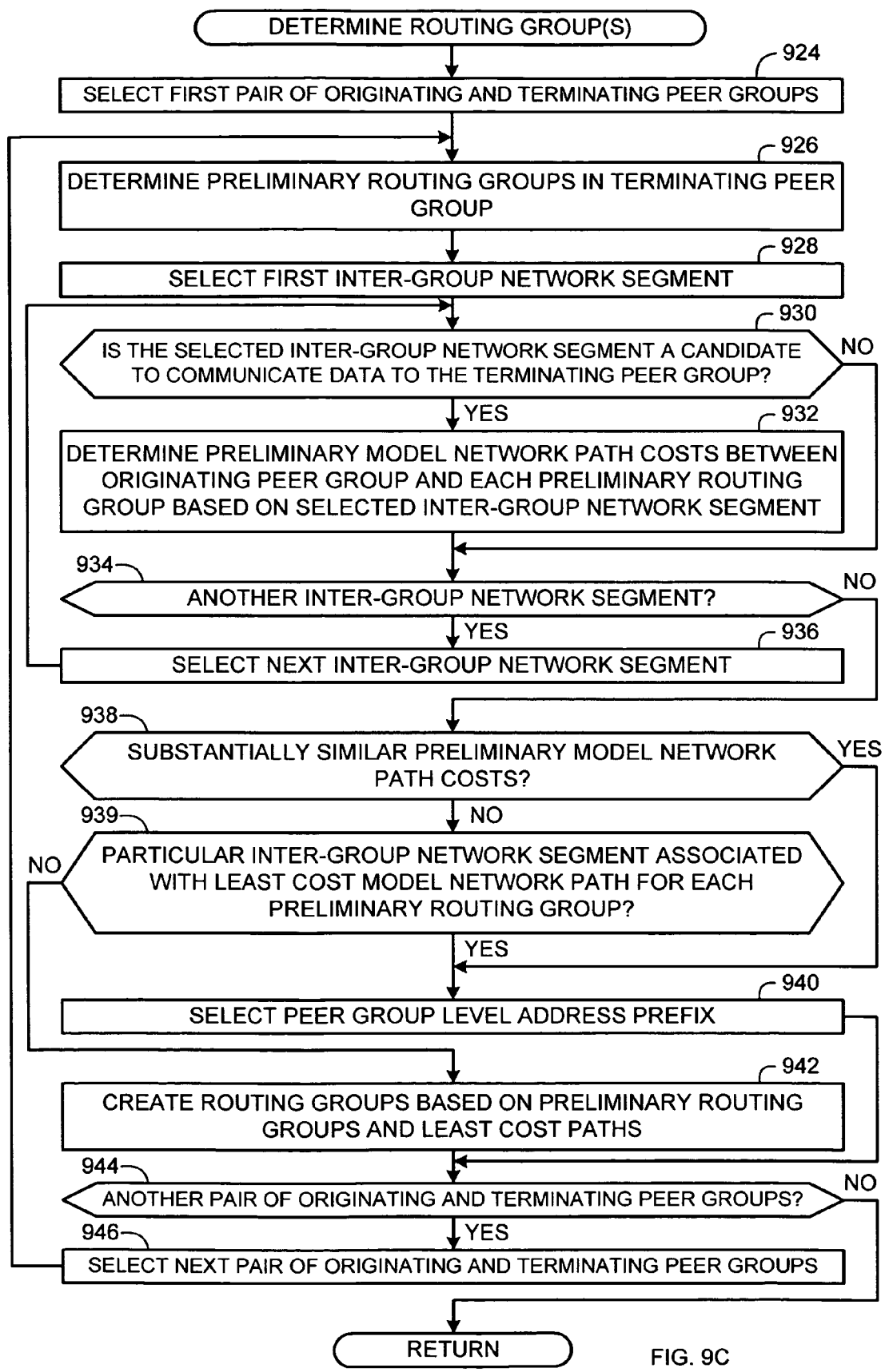
Figure 9D:
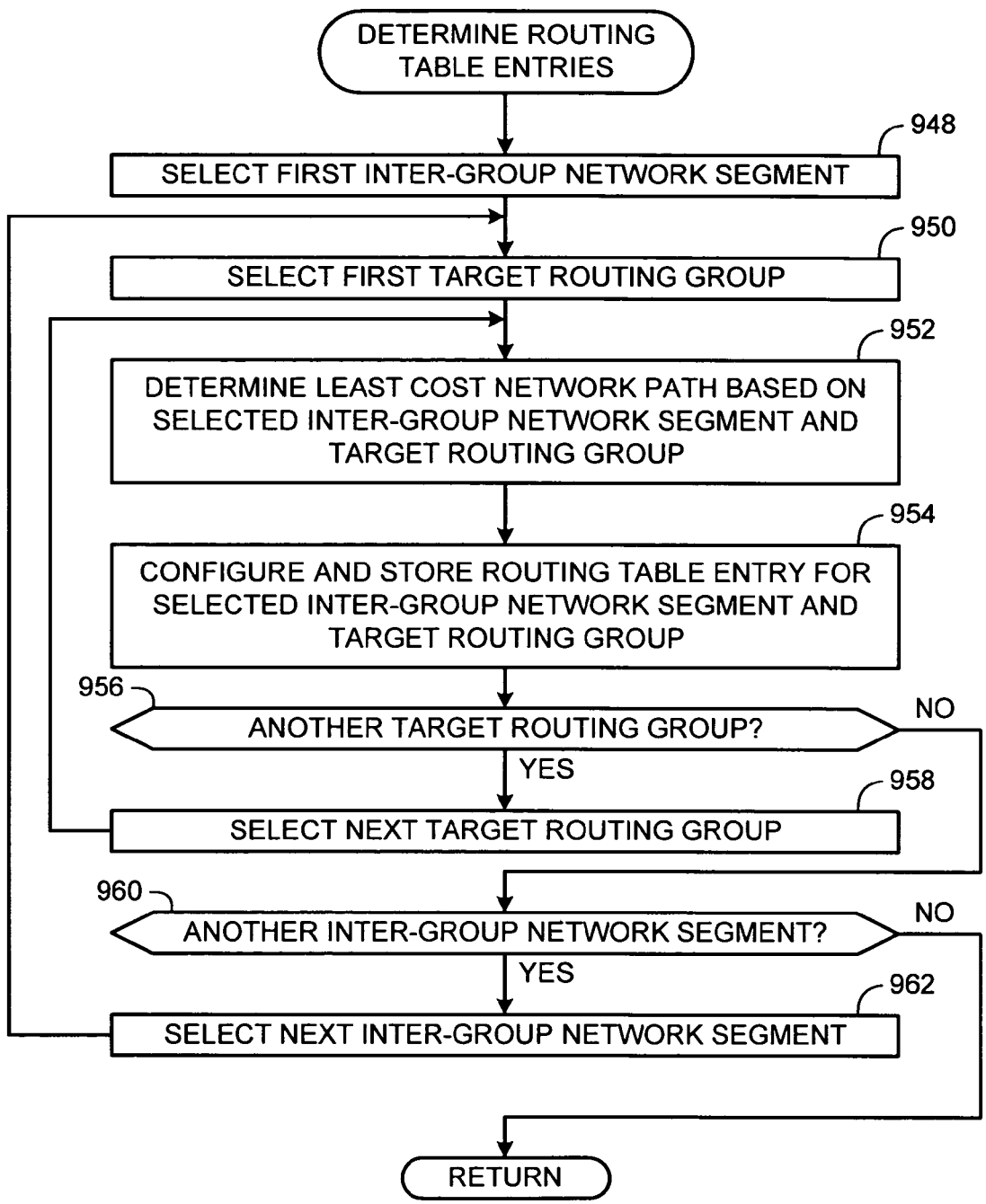

The flow charts illustrated in FIGS. 9B, 9C, and 9D may be used to implement the operation of block 902 of FIG. 9A to determine and/or establish a network configuration. Although the operations described below in connection with FIGS. 9B, 9C, and 9D may be performed by a system engineer, a processor system (e.g., the processor system 1000 of FIG. 10), a hardware system (e.g., the example system 700 of FIG. 7), or any combination thereof, for purposes of clarity the operations are described in combination with the example system 700. As shown in FIG. 9B, the peer group generator 706 (FIG. 7) groups nodes into peer groups (block 910). For example, the peer group generator 706 may obtain addresses or ID's of nodes and network segments from the network configuration database 702 to determine the layout of the nodes within the example telecommunications network 100 (FIGS. 1, 3, and 6). The peer group generator 706 then groups the nodes into peer groups based on the node and network segment addresses/ID's and the layout information as described above in connection with FIG. 7.

The address selector 710 then determines a hierarchical addressing plan (block 912). For example, the address selector may use a hierarchical addressing configuration such as AESA to determine the hierarchical addressing plan as described above in connection with FIG. 4. The administrative cost generator 712 then determines an administrative cost for each network segment and each node (block 914). For example, the administrative cost generator 712 may determine the transmission medium length value for each network segment (e.g., the network segments 108, 110, and 114 of FIG. 1) and the switch factor value for each node (e.g., the nodes 104a-f and 106 of FIG. 1) of the example telecommunications network 100 and store the transmission medium length values and switch factor values in the transmission medium length database 704 (FIG. 7). The administrative cost generator 712 may obtain transmission medium length values for network segments and switch factor values based on user input.

The routing group generator 708 (FIG. 7) then determines one or more routing groups (block 916) such as, for example, the routing groups 402, 404a-b, and 406a-b of FIG. 4. An example method that may be used to implement the operation of block 916 is described in detail below in connection with FIG. 9C. The administrative cost generator 712 then determines the routing table entries for each inter-group node (block 918) (e.g., each of the inter-group nodes 104a-f of FIG. 1). An example method that may be used to implement the operation of block 918 is described below in connection with FIG. 9D. After determining the routing table entries, the example system 700 determines if another network segment has been added (block 920). For example, the example system 700 may determine that another network segment has been added based on user input or by scanning data records in the network configuration database 702 (FIG. 7) and/or the transmission medium length database 704 (FIG. 7) for any new entries.

If the example system 700 determines that a new network segment has been added, then control is passed back to block 914. In this manner, new administrative costs and routing table entries may be generated, if necessary, based on the new network segment. In some cases, the addition of a new inter-group network segment may require modifying or updating routing groups. If a new network segment has not been added, the example system 700 determines if a new node has been added (block 922). The example system 700 may determine that a new node has been added based on, for example, user input or by scanning data records in the network configuration database 702 (FIG. 7) and/or the transmission medium length database 704 (FIG. 7) for any new entries. If a new node has been added then control is passed back to block 910. In this manner, the new node may be assigned a network address and assigned to a peer group and a routing group. Otherwise, if a new node has not been added, then control is returned to a calling function or process such as, for example, the example method of FIG. 9A.

The example method depicted in the flow diagram of FIG. 9C may be used to implement the operation of block 916 of FIG. 9B to determine one or more routing group(s) per peer group (e.g., the routing groups 402, 404a-b, and 406a-b of FIG. 4) using, for example, the example system 700 of FIG. 7. Initially, the routing group generator 708 selects a first pair of originating and terminating peer groups (block 924). For example, if the one or more routing group(s) are determined based on the CHI inter-group node 104e being the source node, then the routing group generator 708 may select the MOKA peer group 102e as the originating peer group. Also, if the routing groups are to be determined based on the nodes in the NOCA peer group 102a, then the routing group generator 708 selects the NOCA peer group 102a as the terminating peer group. The example method of FIG. 9C may be executed or performed for every possible pair of originating and terminating peer groups.

The routing group generator 708 then determines a plurality of preliminary routing groups in the terminating peer group (block 926). For example, the preliminary routing groups may be determined, created, or formed based on geographical locations of nodes by, for example, grouping nodes that are located less than a threshold geographical distance (e.g., less than a distance threshold value) from one another. In some cases, nodes within a particular city or metropolitan area may be grouped to form a preliminary routing group. The preliminary routing groups are used to determine preliminary administrative costs as described below to determine final routing groups such as, for example, the routing groups 402, 404a-b, and 406a-b of FIG. 4.

The routing group generator 708 then selects a first inter-group network segment (block 928). For example, the routing group generator 708 may select the CHI-DEN inter-group network segment 110 (FIG. 1). The routing group generator 708 then determines whether the selected inter-group network segment is a candidate to communicate data to the terminating peer group (block 930). For example, the routing group generator 708 may determine whether the inter-group network segment is a candidate based on several criteria. An example criterion may be availability of bandwidth capacity. Another example criterion may be whether the selected inter-group network segment is capable of being communicatively coupled to the terminating peer group via subsequent network segments. Yet another example criterion may be that the inter-group network segment must not be clearly or obviously associated with a relatively greater administrative cost than other inter-group network segments such as, for example, an inter-group network segment that communicates data away from the terminating peer group.

If the routing group generator 708 determines at block 930 that the selected inter-group network segment is a candidate to communicate data to the terminating peer group, then the administrative cost generator 712 determines preliminary model network path costs between the originating peer group determined at block 924 and each preliminary routing group determined at block 926 based on the inter-group network segment selected at block 928 (block 932). For example, the administrative cost generator 712 may use transmission medium lengths and switch factor values in combination with a well-known routing algorithm such as, for example, OSPF, to calculate a plurality of model network path costs, each associated with a model network path including the selected inter-group network segment and having a least transmission medium length from the CHI inter-group node 104e to an ingress node of one of the preliminary routing groups.

After the administrative cost generator 712 determines the preliminary model network path costs at block 932 or if the routing group generator 708 determines at block 930 that the selected inter-group network segment is not a candidate, the routing group generator 708 determines if another inter-group network segment communicatively coupled to the originating peer group may be selected (block 934). For example, the routing group generator 708 may determine if another inter-group network segment communicatively coupled to any inter-group nodes (e.g., the CHI inter-group node 104e or the KC inter-group node 104g of FIG. 3) of the MOKA peer group 102e may be selected. If the routing group generator 708 determines that another inter-group network segment can be selected, then the routing group generator 708 selects a next inter-group network segment (block 936) (e.g., a KC-HOU-2 inter-group network segment 116 of FIG. 1 that communicatively couples the KC-inter-group node 104g to the TX peer group 102d) and control is passed back to block 930.

If the routing group generator 708 determines that another inter-group network segment is not available for selection, then the routing group generator 708 determines if all of the preliminary model network path costs determined at block 932 for all of the preliminary routing groups determined at block 926 and all of the inter-group network segments selected at blocks 928 and 936 are substantially similar (block 938). For example, the routing group generator 708 may compare the model network path costs determined at block 932 to one another and use a predetermined difference threshold value to determine if they are substantially similar in transmission medium length.

If the routing group generator 708 determines at block 938 that all of the model network path costs determined at block 932 for the selected inter-group network segments are not substantially similar, the routing group generator 708 determines if a particular one of the inter-group network segments is associated with the least model network path for each preliminary routing group (block 939). For example, if three preliminary routing groups were formed at block 926, and a different model network path was determined at block 932 for each of the three preliminary routing groups, the routing group generator 708 determines if any one of the inter-group network segments selected at block 928 or block 936 is used to form all three of the model network paths.

If the routing group generator 708 determines at block 939 that a particular inter-group network segment is associated with (e.g., included in, used to form, etc.) the least cost model network path for each of the preliminary routing groups, or if the routing group generator 708 determines at block 938 that all of the model network path costs are substantially similar for each inter-group network segment, then the address selector 710 selects a peer group level address prefix (block 940) for all routing from the originating peer group (e.g., the MOKA peer group 102e of FIG. 1) to the terminating peer group (e.g., the NOCA peer group 102a of FIG. 1). In this manner, a network operator may use a single model network path cost to determine a network path via which to establish a communication link (e.g., a PVC) between any node in the MOKA peer group 102e and any node in the NOCA peer group 102a.

If the routing group generator 708 determines at block 939 that none of the inter-group network segments selected at block 928 or block 936 is common to (e.g., included in, used to form, etc.) the least cost model network paths for the preliminary routing groups, then the routing generator 708 creates routing groups (e.g., the routing groups 404a-b and/or 406a-b of FIG. 4) based on some or all of the preliminary routing groups determined at block 926 (block 942). In an example implementation, the routing group generator 708 may form relatively larger routing groups by combining preliminary routing groups that are associated with preliminary model network path costs that are substantially similar to one another, thus, reducing the number of routing groups and the number of model network path costs. After selecting a peer group level address prefix at block 940 or after creating the routing groups at block 942, the routing group generator 708 determines if there is another pair of originating and terminating peer groups for which to determine model network paths (block 944). If the routing group generator 708 determines that there is another pair of originating and terminating peer groups, then the routing group generator 708 selects the next pair of originating and terminating peer groups (block 946). Otherwise, the control is returned to a calling function or process such as, for example, the example method of FIG. 9B.

The example method of FIG. 9D may be used to implement the operation of block 918 of FIG. 9B to determine routing table entries (e.g., the routing table entries 502 of FIGS. 5A and 5B) using, for example, the example system 700 of FIG. 7. Initially, the routing table interface 714 (FIG. 7) selects a first inter-group network segment (block 948) (e.g., the CHI-DEN inter-group network segment 110 of FIG. 1) and a first target routing group (block 950) (e.g., one of the routing groups created at block 942 of FIG. 9C). For example, the routing table interface 714 may select a first inter-group network segment based on one of the originating peer groups selected at block 924 or block 946 of FIG. 9C. The administrative cost generator 712 then determines a least cost model network path based on the selected inter-group network segment and the target routing group (block 952) using, for example, a least cost routing algorithm such as OSPF.

The routing table interface 714 then configures and stores a routing table entry for the selected inter-group network segment and the target routing group (block 954). For example, the routing table interface 714 may obtain the model network path cost determined at block 952. Also, the routing table interface 714 may obtain an address prefix associated with the target routing group from the address selector 710 and/or the network configuration database 702. The routing table interface 714 may also obtain a network segment ID from the network configuration routing database 702 for the selected inter-group network segment. The routing table interface 714 may store the address prefix, the model network path cost and the network segment ID in one of the routing table entries 512 (FIGS. 5A and 5B).

The routing table interface 714 then determines if there is another target routing group (block 956) for which to determine a routing table entry. If there is another target routing group, then the routing table interface 714 selects a next target routing group (block 958) and control is passed back to block 952. Otherwise, if there is not another target routing group the routing table interface 714 determines if there is another inter-group network segment (block 960) for which to determine a routing table entry. If there is another inter-group network segment, then the routing table interface 714 selects a next inter-group network segment (block 962) and control is returned to block 950. Otherwise, if there is not another inter-group network segment, control is returned to a calling function or process such as, for example, the example method of FIG. 9B.

Figure 9E:
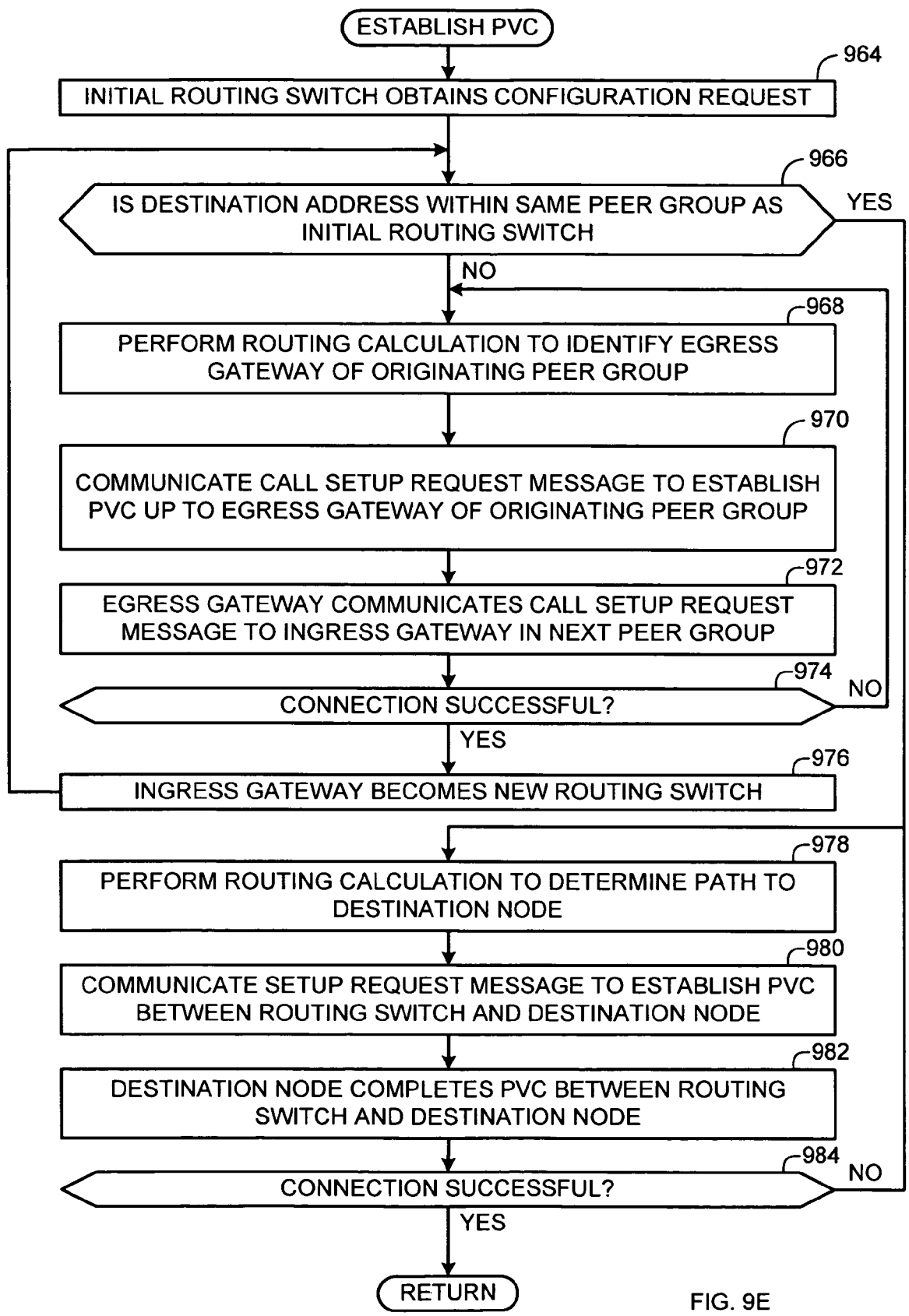

The example method depicted in the flow diagram of FIG. 9E may be used to implement the operation of block 904 of FIG. 9A to establish a PVC. The example method of FIG. 9E may be implemented using the example intra-group switch 802 and the example inter-group switch 804 of FIG. 8 and/or any other switch or network device used to implement the nodes of the example telecommunications network 100 of FIGS. 1, 3, and 6. Initially, an initial routing switch obtains a configuration request (block 964). For example, if the intra-group switch 802 is the initial routing switch, then the intra-group switch 802 obtains the PVC setup information 812 (FIG. 8), which may include a destination address and a request to configure or establish a PVC to communicate data to the destination address.

The destination analyzer 816 then determines if the destination address is within the same peer group as the initial routing switch (block 966). For example, the destination analyzer 816 may obtain the destination address from the PVC setup information 812 and compare the destination address to node addresses obtained via the peer group topology interface 820 (FIG. 8) to determine if the destination address matches any of the node addresses. If the destination analyzer 816 determines that the destination address is not within the same peer group, the initial routing switch performs a routing calculation to identify an egress gateway (e.g., an inter-group node) of the originating peer group (block 968). For example, the intra-group switch 802 may use the routing information obtained via the peer group topology interface 820 and routing information obtained from the routing table 824 to determine the inter-group node (e.g., the inter-group switch 804) associated with the model network path to the destination address as described above in connection with FIG. 6.

The intra-group switch 802 and any node between the intra-group switch 802 and the egress gateway determined at block 968 then use a call setup request message based on a protocol such as, for example, PNNI, to establish a PVC up to the egress gateway of the originating peer group (block 970). The egress gateway then communicates the call setup request message to the ingress gateway in the next peer group (block 972) using, for example, an AINI protocol. For example, in FIG. 6, the CHI inter-group node 104e is an egress gateway that can communicate a call setup request message to the DEN inter-group node 104f, which may be an ingress gateway of the next peer group.

Any switch, gateway, or otherwise node to which the call setup request message is communicated may determine if the connection to that switch, gateway, node, etc. was successful. Accordingly, a node (e.g., a current routing switch) determines if the connection (e.g., the connection between the egress gateway and the ingress gateway) was successful (block 974). If the connection is unsuccessful or the PVC setup is unable to advance, then control is passed back to block 968 with an indication of where the PVC setup failed. In this manner, the original routing node may eliminate the link at which the PVC setup failed from its routing tables and may attempt to find an alternate path for the requested PVC. Otherwise, if the connection was successful, then the ingress gateway becomes the new routing switch and control is passed back to block 966.

If the destination analyzer 816 (in either the initial routing switch as determined at block 964 or another (e.g., a subsequent) routing switch as determined at block 976) determines at block 966 that the destination address obtained from the PVC setup information 812 is within the same peer group as the routing switch, then the routing switch performs a calculation to determine a path to the destination node (block 978) within the same peer group. The routing switch then communicates a call setup request message using, for example, a PNNI protocol, to one or more other nodes within the same peer group to establish a PVC between the routing switch and the destination node (block 980). The destination node then completes the PVC between the routing switch and the destination node (block 982). It is then determined if the PVC setup was successful (block 984). If at any node along the network path the PVC setup could not be advanced, control is passed back to block 978. Otherwise, if the connection was successful, control is returned to a calling process or function such as, for example, the example method of FIG. 9A.

Figure 10:
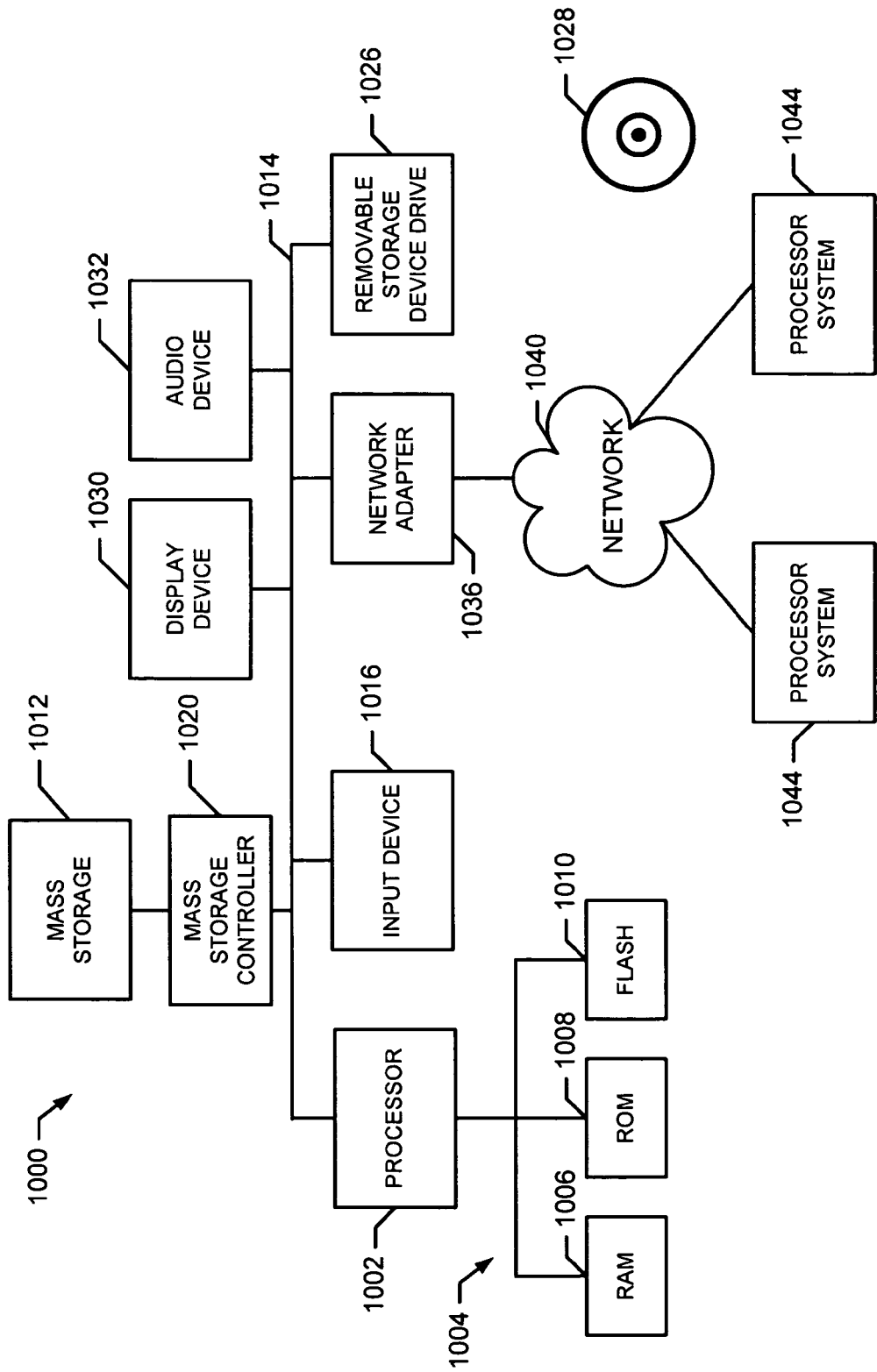
FIG. 10 is a block diagram of an example processor system that may be used to implement the example systems and methods described herein.

FIG. 10 depicts an example processor system 1000 that, in general, may be used to implement the example methods and systems described herein. The example processor system 1000 includes a processor 1002 having associated system memory 1004. The system memory 1004 may include one or more of a random access memory (RAM) 1006, a read only memory (ROM) 1008, and a flash memory 1010, or any other type of memory device.

The processor 1002, in the example of FIG. 10, is coupled to an interface, such as a bus 1014 to which other peripherals or devices are interfaced/coupled. In the illustrated example, the peripherals interfaced to the bus 1014 include an input device 1016, a mass storage controller 1020 communicatively coupled to a mass storage memory 1012 (e.g., a hard disk drive), and a removable storage device drive 1026. The removable storage device drive 1026 may include associated removable storage media 1028, such as magnetic or optical media. The example processor system 1000 of FIG. 10 also includes a display device 1030 and an audio device 1032, both of which are peripherals coupled to the bus 1014.

The example processor system 1000 may be, for example, a conventional desktop personal computer, a notebook computer, a workstation or any other computing device. The processor 1002 may be any type of processing unit, such as a microprocessor from Intel or any other processor manufacturer.

The memories 1006, 1008, and 1010, which form some or all of the system memory 1004, may be any suitable memory devices and may be sized to fit the storage demands of the system 1000. The ROM 1008, the flash memory 1010, and the mass storage memory 1012 are non-volatile memories. Additionally, the mass storage memory 1012 may be, for example, any magnetic or optical media that is readable by the processor 1002.

The input device 1016 may be implemented using a keyboard, a mouse, a touch screen, a track pad, microphone, or any other device that enables a user to provide information to the processor 1002. Further examples may include a cell phone, a personal digital assistant (PDA), a remote control, etc.

The removable storage device drive 1026 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 1028 is complimentary to the removable storage device drive 1026, inasmuch as the media 1028 is selected to operate with the drive 1026. For example, if the removable storage device drive 1026 is an optical drive, the removable storage media 1028 may be a CD-R disk, a CD-RW disk, a DVD disk, or any other suitable optical disk. On the other hand, if the removable storage device drive 1026 is a magnetic media device, the removable storage media 1028 may be, for example, a diskette, or any other suitable magnetic storage media. The display device 1030 may be, for example, a liquid crystal display (LCD) monitor, a cathode ray tube (CRT) monitor, or any other suitable device that acts as an interface between the processor 1002 and a user's or observer's visual sense. Furthermore, the display device 1030 may be part of a conventional television.

The example processor system 1000 also includes a network adapter 1036, such as, for example, a frame relay network interface card, an ATM network interface card or any other network interface card. The network adapter 1036 provides network connectivity between the processor 1002 and a network 1040, which may be communicatively coupled to the example telecommunications network 100 of FIG. 1. As shown in FIG. 10, further processor systems 1044 may be coupled to the network 1040, thereby providing for information exchange between the processor 1002 and the processors of the processor systems 1044.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of determining a network route, comprising:
  selecting a source network node and a plurality of destination network nodes;
  determining a plurality of network routes between the source network node and the plurality of destination network nodes;
  determining a plurality of administrative costs associated with the plurality of network routes based on a plurality of transmission medium length values;
  determining an address prefix associated with at least some of the plurality of destination network nodes based on the plurality of administrative costs; and
  associating at least one of the plurality of network routes with the address prefix.

2. A method as defined in claim 1, further comprising storing one of the plurality of administrative costs associated with the at least one of the plurality of network routes in a network switch.

3. A method as defined in claim 1, wherein the at least one of the plurality of network routes is an optimal network route.

4. A method of determining an administrative cost for a network path, comprising:
  identifying a plurality of network segments and a plurality of network switches forming a network path between first and second network nodes, the network segments having respective transmission medium lengths and the network nodes having respective switch factors; and
  determining the administrative cost for the network path based on the transmission medium lengths and the switch factors.

5. A method as defined in claim 4, further comprising storing the administrative cost in a network routing table associated with the first network node.

6. A method as defined in claim 4, wherein the first network node is a first network switch in a first peer group, and wherein the second network node is a second network switch in a second peer group.

7. A method as defined in claim 4, wherein determining the administrative cost comprises:
  computing a sum of the transmission medium lengths and the switch factors.

8. A method as defined in claim 7, wherein each of the switch factors represents a respective transmission medium length.

9. A method as defined in claim 4, wherein the network path is between the first network node and a routing group.

10. A method as defined in claim 9, wherein the routing group includes a plurality of nodes having addresses that include a same address prefix.

11. A method as defined in claim 4, wherein each of the transmission medium lengths represents a measure of length associated with at least one of miles, kilometers or a length metric.

12. A method as defined in claim 4, wherein a first of the transmission medium length lengths is associated with at least one of a fiber or a copper cable or a transmission medium.

13. A method as defined in claim 4, wherein the administrative cost is an optimal administrative cost.

14. An apparatus to select a network path for data frames, comprising:
  a processor system; and
  a memory communicatively coupled to the processor system, the memory including stored instructions that enable the processor system to at least:
    identify an inter-group network segment and a network switch forming a network path between a first network node and a group of second network nodes, the inter-group network segment having a transmission medium length and the network switch having an associated switch factor; and
    determine an administrative cost associated with the inter-group network segment and the network switch based on the transmission medium length and the switch factor.

15. An apparatus as defined in claim 14, wherein the instructions enable the processor system to store the transmission medium length in a routing table associated with the first network node.

16. An apparatus as defined in claim 14, wherein the first network node is associated with a first peer group.

17. An apparatus as defined in claim 14, wherein the instructions enable the processor system to at least:
  determine a second transmission medium length by multiplying the switch factor by a third transmission medium length; and
  compute the administrative cost as a sum of the first and second transmission medium lengths.

18. An apparatus as defined in claim 14, wherein the second network nodes have addresses that include a same address prefix.

19. A non-transitory computer-readable medium having instructions stored thereon that, when executed, cause a processor to at least:
  identify an inter-group network segment and a network switch forming a network path between first and second network nodes, the inter-group network segment having a transmission medium length and the network switch having an associated switch factor;
  determine a transmission medium length value associated with the network path based on the transmission medium length and the switch factor, wherein the transmission medium length value is associated with an administrative cost for the network path; and
  store the transmission medium length value.

20. A non-transitory computer-readable medium as defined in claim 19 having instructions stored thereon that, when executed, cause the processor to at least store the transmission medium length in a routing table associated with the first network node.

21. A non-transitory computer-readable medium as defined in claim 19, wherein the first network node is associated with a first peer group, and wherein the second network node is associated with a second peer group.

22. A non-transitory computer-readable medium as defined in claim 19, wherein the transmission medium length value includes a quantity of network switches multiplied by the switch factor.

23. A non-transitory computer-readable medium as defined in claim 22 having instructions stored thereon that, when executed, cause the processor to at least multiply the quantity of network switches by the switch factor by multiplying the quantity of network switches by a second transmission medium length.

24. A non-transitory computer-readable medium as defined in claim 19 having instructions stored thereon that, when executed, cause the processor to determine the network path between the first and second network nodes by determining the network path between the first network node and a routing group.

25. A non-transitory computer-readable medium as defined in claim 19 having instructions stored thereon that, when executed, cause the processor to determine the network path based on an address associated with the first network node and an address prefix associated with the second network node.

26. A system to determine administrative costs for network paths, comprising:
   a routing group generator configured to form a routing group, wherein the routing group includes at least one network node;
   an address selector communicatively coupled to the routing group generator and configured to determine an address prefix associated with the routing group; and
   an administrative cost generator communicatively coupled to the routing group generator and the address selector and configured to determine an administrative cost for a network path between a source node and the routing group based on a transmission medium length value.

27. A system as defined in claim 26, further comprising a network routing table interface communicatively coupled to the administrative cost generator and configured to store the administrative cost in a routing table associated with the source network node.

28. A system as defined in claim 26, wherein the source network node is associated with a first peer group, and wherein the routing group includes a destination network node in a second peer group.

29. A system as defined in claim 26, wherein the routing group includes a plurality of network nodes having addresses that include a same address prefix.

30. A system as defined in claim 26, wherein the transmission medium length value is a measure of length associated with at least one of miles or kilometers or a length metric.

31. A system as defined in claim 26, wherein the transmission medium length value is associated with at least one of a fiber or a copper cable or a transmission medium.

32. A network having a plurality of network nodes and a plurality of network segments, wherein at least a first one of the network nodes includes a memory to store at least one transmission medium length value associated with a network path between the first one of the network nodes and a second one of the network nodes, and wherein the first one of the network nodes determines an administrative cost between the first and second ones of the network nodes based on the transmission medium length value, wherein the transmission medium length value represents a plurality of transmission medium lengths associated with respective ones of a plurality of network segments of the network path and a plurality of switch factors associated with respective ones of a plurality of network nodes of the network path.

33. A network as defined in claim 32, wherein the first one of the network nodes determines the administrative cost between the first and second ones of the network nodes by determining the administrative cost between the first network node and a routing group including the second one of the network nodes.

34. A network as defined in claim 32, wherein the first one of the network nodes determines the administrative cost between the first and second ones of the network nodes based on an address of the first network node and an address prefix of the second network node.

35. A network as defined in claim 32, wherein the memory includes a routing table.

* * * * *